(12) United States Patent
Miller et al.

(10) Patent No.: US 11,307,661 B2
(45) Date of Patent: Apr. 19, 2022

(54) ELECTRONIC DEVICE WITH ACTUATORS FOR PRODUCING HAPTIC AND AUDIO OUTPUT ALONG A DEVICE HOUSING

(71) Applicant: Apple Inc., Cupertino, CA (US)

(72) Inventors: Ari P. Miller, San Francisco, CA (US); Justin D. Crosby, Cupertino, CA (US); Daniel K. Boothe, San Francisco, CA (US); Houtan R. Farahani, Cupertino, CA (US); Kevin M. Robinson, Sunnyvale, CA (US); Ryan J. Mihelich, Morgan Hill, CA (US); Robert J. Lockwood, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 97 days.

(21) Appl. No.: 16/121,454

(22) Filed: Sep. 4, 2018

(65) Prior Publication Data

US 2019/0094973 A1 Mar. 28, 2019

Related U.S. Application Data

(60) Provisional application No. 62/562,783, filed on Sep. 25, 2017.

(51) Int. Cl.
*G06F 3/01* (2006.01)
*H04R 1/02* (2006.01)
(Continued)

(52) U.S. Cl.
CPC .......... *G06F 3/016* (2013.01); *G06F 3/03547* (2013.01); *G06F 3/041* (2013.01);
(Continued)

(58) Field of Classification Search
None
See application file for complete search history.

(56) References Cited

U.S. PATENT DOCUMENTS

| 1,276,708 A | 8/1918 | Blair |
| 1,646,628 A | 10/1927 | Nolen |
| (Continued) | | |

FOREIGN PATENT DOCUMENTS

| CN | 2831113 | 10/2006 |
| CN | 204104134 | 1/2015 |
| (Continued) | | |

OTHER PUBLICATIONS

Baechtle et al., "Adjustable Audio Indicator," IBM, 2 pages, Jul. 1, 1984.

(Continued)

*Primary Examiner* — Brian M Butcher
(74) *Attorney, Agent, or Firm* — Brownstein Hyatt Farber Schreck, LLP

(57) ABSTRACT

An electronic device has a housing that forms an exterior surface of the electronic device. An array of actuators is coupled to the housing and is operable to move the housing in order to produce sound waves and/or haptic output via the exterior surface. In this way, less space is consumed by acoustic and haptic devices as compared to similar conventional devices, thereby allowing for thinner electronic devices and/or room for other components within the housing. The actuators may be operable to move different regions of the housing to produce sound waves and/or haptic output within different frequency ranges.

16 Claims, 18 Drawing Sheets

(51) Int. Cl.
*G06F 3/041* (2006.01)
*H04R 1/24* (2006.01)
*G06F 3/0354* (2013.01)
*H04R 7/04* (2006.01)
*H04R 17/00* (2006.01)
*H04R 9/06* (2006.01)

(52) U.S. Cl.
CPC ............ *H04R 1/028* (2013.01); *H04R 1/24* (2013.01); *H04R 7/04* (2013.01); *H04R 9/06* (2013.01); *H04R 17/00* (2013.01); *H04R 2400/03* (2013.01); *H04R 2499/11* (2013.01); *H04R 2499/13* (2013.01); *H04R 2499/15* (2013.01)

(56) References Cited

U.S. PATENT DOCUMENTS

| | | |
|---|---|---|
| 1,893,291 A | 1/1933 | Kwartin |
| 1,992,605 A | 2/1935 | Clifford et al. |
| 2,325,688 A | 7/1943 | Landis |
| 2,779,095 A | 1/1957 | Hottenroth, Jr. |
| 3,414,689 A | 12/1968 | Gummel et al. |
| 3,866,299 A | 2/1975 | Gregg et al. |
| 4,068,103 A | 1/1978 | King et al. |
| 4,081,631 A | 3/1978 | Feder |
| 4,089,576 A | 5/1978 | Barchet |
| 4,095,411 A | 6/1978 | Kondo |
| 4,132,437 A | 1/1979 | Green |
| 4,245,642 A | 1/1981 | Skubitz et al. |
| 4,352,168 A | 9/1982 | Anderson et al. |
| 4,466,441 A | 8/1984 | Skubitz et al. |
| 4,658,425 A | 4/1987 | Julstrom |
| 5,106,318 A | 4/1992 | Endo et al. |
| 5,293,002 A | 3/1994 | Grenet et al. |
| 5,335,011 A | 8/1994 | Addeo et al. |
| 5,341,433 A | 8/1994 | Meyer et al. |
| 5,406,038 A | 4/1995 | Reiff et al. |
| 5,521,886 A | 5/1996 | Hirosawa et al. |
| 5,570,324 A | 10/1996 | Geil |
| 5,604,329 A | 2/1997 | Kressner et al. |
| 5,619,583 A | 4/1997 | Page et al. |
| 5,733,153 A | 3/1998 | Takahashi et al. |
| 5,879,598 A | 3/1999 | McGrane |
| 5,958,203 A | 9/1999 | Parce et al. |
| 5,960,366 A | 9/1999 | Duwaer |
| 6,036,554 A | 3/2000 | Koeda et al. |
| 6,073,033 A | 6/2000 | Campo |
| 6,129,582 A | 10/2000 | Wilhite et al. |
| 6,151,401 A | 11/2000 | Annaratone |
| 6,154,551 A | 11/2000 | Frenkel |
| 6,191,796 B1 | 2/2001 | Tarr |
| 6,192,253 B1 | 2/2001 | Charlier et al. |
| 6,317,237 B1 | 11/2001 | Nakao et al. |
| 6,370,005 B1 | 4/2002 | Sun et al. |
| 6,373,958 B1 * | 4/2002 | Enomoto ............... G10K 9/12 381/406 |
| 6,385,134 B1 | 5/2002 | Lange et al. |
| 6,400,825 B1 | 6/2002 | Miyamoto et al. |
| 6,516,077 B1 | 2/2003 | Yamaguchi et al. |
| 6,553,126 B2 | 4/2003 | Han et al. |
| 6,700,987 B2 | 3/2004 | Kuze et al. |
| 6,754,359 B1 | 6/2004 | Svean et al. |
| 6,813,218 B1 | 11/2004 | Antonelli et al. |
| 6,829,018 B2 | 12/2004 | Lin et al. |
| 6,882,335 B2 | 4/2005 | Saarinen |
| 6,892,850 B2 | 5/2005 | Suzuki et al. |
| 6,924,792 B1 | 8/2005 | Jessop |
| 6,934,394 B1 | 8/2005 | Anderson |
| 6,942,771 B1 | 9/2005 | Kayyem |
| 7,003,099 B1 | 2/2006 | Zhang et al. |
| 7,059,932 B1 | 6/2006 | Tobias et al. |
| 7,082,322 B2 | 7/2006 | Harano |
| 7,116,795 B2 | 10/2006 | Tuason et al. |
| 7,154,526 B2 | 12/2006 | Foote et al. |
| 7,158,647 B2 | 1/2007 | Azima et al. |
| 7,181,030 B2 | 2/2007 | Rasmussen et al. |
| 7,263,373 B2 | 8/2007 | Mattisson |
| 7,266,189 B1 | 9/2007 | Day |
| 7,362,877 B2 | 4/2008 | Honda et al. |
| 7,378,963 B1 | 5/2008 | Begault et al. |
| 7,414,922 B2 | 8/2008 | Ferri et al. |
| 7,527,523 B2 | 5/2009 | Yohn et al. |
| 7,536,029 B2 | 5/2009 | Choi et al. |
| 7,570,772 B2 | 8/2009 | Sorensen et al. |
| 7,679,923 B2 | 3/2010 | Inagaki et al. |
| 7,792,320 B2 | 9/2010 | Proni |
| 7,867,001 B2 | 1/2011 | Ambo et al. |
| 7,878,869 B2 | 2/2011 | Murano et al. |
| 7,903,061 B2 | 3/2011 | Zhang et al. |
| 7,912,242 B2 | 3/2011 | Hikichi |
| 7,966,785 B2 | 6/2011 | Zadesky et al. |
| 8,031,853 B2 | 10/2011 | Bathurst et al. |
| 8,055,003 B2 | 11/2011 | Mittleman et al. |
| 8,116,505 B2 | 2/2012 | Kawasaki-Hedges et al. |
| 8,116,506 B2 | 2/2012 | Kuroda et al. |
| 8,161,890 B2 | 4/2012 | Wang |
| 8,204,266 B2 | 6/2012 | Munoz et al. |
| 8,218,397 B2 | 7/2012 | Chan |
| 8,226,446 B2 | 7/2012 | Kondo et al. |
| 8,264,777 B2 | 9/2012 | Skipor et al. |
| 8,286,319 B2 | 10/2012 | Stolle et al. |
| 8,331,603 B2 | 12/2012 | Martenson et al. |
| 8,340,312 B2 | 12/2012 | Johnson et al. |
| 8,409,417 B2 | 4/2013 | Wu |
| 8,417,298 B2 | 4/2013 | Mittleman et al. |
| 8,447,054 B2 | 5/2013 | Bharatan et al. |
| 8,452,037 B2 | 5/2013 | Filson et al. |
| 8,488,817 B2 | 7/2013 | Mittleman et al. |
| 8,508,908 B2 | 8/2013 | Jewell-Larsen |
| 8,560,309 B2 | 10/2013 | Pance et al. |
| 8,574,004 B1 | 11/2013 | Tarchinski et al. |
| 8,620,162 B2 | 12/2013 | Mittleman |
| 8,632,670 B2 | 1/2014 | Garimella et al. |
| 8,644,519 B2 | 2/2014 | Pance et al. |
| 8,644,533 B2 | 2/2014 | Burns |
| 8,693,698 B2 | 4/2014 | Carnes et al. |
| 8,724,841 B2 | 5/2014 | Bright et al. |
| 8,804,993 B2 | 8/2014 | Shukla et al. |
| 8,811,648 B2 | 8/2014 | Pance et al. |
| 8,858,271 B2 | 10/2014 | Yeung et al. |
| 8,879,761 B2 | 11/2014 | Johnson et al. |
| 8,882,547 B2 | 11/2014 | Asakuma et al. |
| 8,885,851 B2 | 11/2014 | Westenbroek et al. |
| 8,983,097 B2 | 3/2015 | Dehe et al. |
| 8,989,428 B2 | 3/2015 | Kwong |
| 9,007,871 B2 | 4/2015 | Armstrong-Muntner |
| 9,042,588 B2 | 5/2015 | Aase |
| 9,066,172 B2 | 6/2015 | Dix et al. |
| 9,161,434 B2 | 10/2015 | Merz et al. |
| 9,182,859 B2 | 11/2015 | Coulson et al. |
| 9,227,189 B2 | 1/2016 | Sobek et al. |
| 9,229,494 B2 | 1/2016 | Rayner |
| 9,357,299 B2 | 5/2016 | Kwong |
| 9,380,369 B2 | 6/2016 | Utterman et al. |
| 9,386,362 B2 | 7/2016 | Filson et al. |
| 9,451,354 B2 | 9/2016 | Zadesky et al. |
| 9,486,823 B2 | 11/2016 | Andersen et al. |
| 9,497,527 B2 | 11/2016 | Mittleman et al. |
| 9,774,941 B2 | 9/2017 | Grinker |
| 9,820,033 B2 | 11/2017 | Dix et al. |
| 9,838,811 B2 | 12/2017 | Pelosi |
| 9,854,345 B2 | 12/2017 | Briggs |
| 9,857,262 B2 | 1/2018 | Kil et al. |
| 9,888,309 B2 | 2/2018 | Prelogar et al. |
| 9,900,698 B2 | 2/2018 | Luzzato et al. |
| 9,955,244 B2 | 4/2018 | Rothkopf et al. |
| 10,063,951 B2 | 8/2018 | Filson et al. |
| 10,117,012 B2 | 10/2018 | Saulsbury et al. |
| 10,165,694 B1 | 12/2018 | Werner et al. |
| 10,455,311 B2 | 10/2019 | Magariyachi et al. |
| 10,466,047 B2 | 11/2019 | Ehman et al. |
| 10,466,961 B2 | 11/2019 | Yang |
| 10,477,328 B2 | 11/2019 | Han et al. |

(56) References Cited

U.S. PATENT DOCUMENTS

| | | | |
|---|---|---|---|
| 10,684,656 B2 | 6/2020 | MacNeil et al. |
| 10,757,491 B1 | 8/2020 | Jackson et al. |
| 10,837,772 B2 | 11/2020 | MacNeil et al. |
| 10,873,798 B1 | 12/2020 | Jackson et al. |
| 2003/0087292 A1 | 5/2003 | Chen et al. |
| 2004/0203520 A1 | 10/2004 | Schirtzinger et al. |
| 2005/0009004 A1 | 1/2005 | Xu et al. |
| 2005/0271216 A1 | 12/2005 | Lashkari |
| 2006/0072248 A1 | 4/2006 | Watanabe et al. |
| 2006/0233411 A1 | 10/2006 | Utigard |
| 2007/0012827 A1 | 1/2007 | Fu et al. |
| 2007/0191719 A1 | 8/2007 | Yamashita et al. |
| 2008/0204379 A1 | 8/2008 | Perez-Noguera |
| 2008/0260188 A1 | 10/2008 | Kim |
| 2008/0292112 A1 | 11/2008 | Valenzuela et al. |
| 2008/0292126 A1 | 11/2008 | Sacha et al. |
| 2008/0310663 A1 | 12/2008 | Shirasaka et al. |
| 2009/0045005 A1 | 2/2009 | Byon et al. |
| 2011/0002487 A1 | 1/2011 | Panther et al. |
| 2011/0211724 A1 | 9/2011 | Hirata |
| 2012/0052924 A1 | 3/2012 | Cybart et al. |
| 2013/0141364 A1* | 6/2013 | Lynn | H03G 3/02 345/173 |
| 2013/0164999 A1 | 6/2013 | Ge et al. |
| 2013/0280965 A1 | 10/2013 | Kojyo |
| 2013/0322646 A1 | 12/2013 | Davie et al. |
| 2014/0022189 A1* | 1/2014 | Sheng | H04R 3/00 345/173 |
| 2014/0250657 A1 | 9/2014 | Stanley et al. |
| 2015/0002452 A1 | 1/2015 | Klinghult et al. |
| 2015/0023510 A1 | 1/2015 | Shimizu |
| 2015/0078611 A1 | 3/2015 | Boozer et al. |
| 2016/0004311 A1* | 1/2016 | Yliaho | G06F 3/016 381/99 |
| 2016/0150311 A1 | 5/2016 | Bremyer et al. |
| 2016/0324478 A1 | 11/2016 | Goldstein |
| 2017/0094386 A1 | 3/2017 | Trainer et al. |
| 2017/0169673 A1* | 6/2017 | Billington | H04W 4/20 |
| 2017/0180850 A1 | 6/2017 | Hsu et al. |
| 2017/0347179 A1 | 11/2017 | Masaki et al. |
| 2020/0073338 A1 | 3/2020 | Liang et al. |
| 2020/0075272 A1 | 3/2020 | Solis et al. |
| 2020/0100013 A1 | 3/2020 | Harjee et al. |
| 2020/0107110 A1 | 4/2020 | Ji et al. |
| 2020/0344536 A1 | 10/2020 | Jackson et al. |

FOREIGN PATENT DOCUMENTS

| | | |
|---|---|---|
| CN | 016415411 | 2/2017 |
| CN | 107677538 | 2/2018 |
| EP | 2094032 | 8/2009 |
| GB | 2310559 | 8/1997 |
| GB | 2342802 | 4/2000 |
| JP | 2102905 | 4/1990 |
| JP | 2003319490 | 11/2003 |
| JP | 2004153018 | 5/2004 |
| JP | 2006297828 | 11/2006 |
| JP | 2016095190 | 5/2016 |
| WO | WO03/049494 | 6/2003 |
| WO | WO04/025938 | 3/2004 |
| WO | WO2007/083894 | 7/2007 |
| WO | WO08/153639 | 12/2008 |
| WO | WO2009/017280 | 2/2009 |
| WO | WO2011/057346 | 5/2011 |
| WO | WO2011/061483 | 5/2011 |
| WO | WO2016/190957 | 12/2016 |
| WO | WO2018/135849 | 7/2018 |

OTHER PUBLICATIONS

Blankenbach et al., "Bistable Electrowetting Displays," https://spie.org/x43687.xml, 3 pages, Jan. 3, 2011.

Enns, Neil, "Touchpad-Based Remote Control Devices," University of Toronto, 1998.

Pingali et al., "Audio-Visual Tracking for Natural Interactivity," Bell Laboratories, Lucent Technologies, pp. 373-382, Oct. 1999.

Valdes et al., "How Smart Watches Work," https://electronics.howstuffworks.com/gadgets/clocks-watches/smart-watch2.htm, 10 pages, Apr. 2005.

Zhou et al., "Electrostatic Graphene Loudspeaker," Applied Physics Letters, vol. 102, No. 223109, 5 pages, Dec. 6, 2012.

\* cited by examiner

ELECTRONIC DEVICE WITH ACTUATORS FOR PRODUCING HAPTIC AND AUDIO OUTPUT ALONG A DEVICE HOUSING

CROSS-REFERENCE TO RELATED APPLICATION(S)

This application is a nonprovisional patent application of and claims the benefit of U.S. Provisional Patent Application No. 62/562,783, filed Sep. 25, 2017 and titled "Acoustic/Haptic Actuators that Use Housing Surfaces," the disclosure of which is hereby incorporated herein by reference in its entirety.

FIELD

The described embodiments relate generally to acoustic and haptic devices. More particularly, the present embodiments relate to acoustic/haptic actuators that use external housing surfaces to produce sound and haptic output.

BACKGROUND

There are a variety of different electronic devices available. Examples of electronic devices include desktop computing devices, laptop computing devices, cellular telephones, smart phones, tablet computing devices, wearable devices, mobile computing devices, kitchen appliances, automobiles, displays, printers, keyboards, and so on.

Many different electronic devices may include a variety of different input and/or output devices. Examples of input devices may include keyboards, computer mice, touch screens, trackpads, track balls, touch pads, microphones, and so on. Examples of output devices may include displays, speakers, haptic devices, and so on.

Some electronic devices may include both speakers and haptic devices. Multiple components may require more space in the electronic device compared to electronic devices with a single component, leave less room for other components, consume more power, add weight, and so on.

SUMMARY

The present disclosure relates to acoustic/haptic actuators that use external housing surfaces to produce sound and haptic output. An electronic device has a housing that forms an exterior surface of the electronic device. An array of actuators is coupled to the housing and is operable to move the housing in order to produce sound waves and/or haptic output via the exterior surface. In this way, less space is consumed by acoustic and haptic devices as compared to similar conventional devices, thereby allowing for thinner electronic devices and/or room for other components within the housing.

In some implementations, an electronic device includes a housing having a wall that defines an exterior surface of the electronic device, a sensor operable to detect a touch along the exterior surface, an array of actuators positioned below the wall, and a processing unit operably coupled to the sensor and the array of actuators. The processing unit is operable to produce an audio output using the array of actuators, determine a location of the touch using the sensor, modify a first audio output of a first actuator of the array of actuators in response to determining that the location of the touch is proximate to the first actuator, and produce a localized haptic at the location by using the first actuator to move the wall of the housing.

In various examples, the processing unit is further operable to modify a second audio output of a second actuator of the array of actuators in response to the touch. In some examples, the processing unit is operable to determine a type of audio corresponding to the audio output, the processing unit is operable to modify the first audio output by delaying the first audio output if the type of audio is a notification-type output, and the processing unit is operable to modify the first audio output by increasing the first audio output if the type of audio is a media-stream-type output.

In numerous examples, the array of actuators includes a first group of actuators of the array of actuators operable to move a first group of regions of the housing to produce a high-frequency audio output having a first frequency range and a second group of actuators of the array of actuators to move a second group of regions of the housing to produce a low-frequency audio output having a second frequency range that is different than the first frequency range. In some implementations of such examples, each region of the first group of regions is smaller than each region of the second group of regions and the first frequency range is higher than the second frequency range.

In various examples, the housing is a lower housing, the wall is a first wall, the exterior surface is a first exterior surface, the array of actuators is a first array of actuators, and the electronic device further includes an upper housing, pivotably connected to the lower housing and having a second wall that defines a second exterior surface of the electronic device; a second array of actuators positioned below the second wall; a display coupled to the upper housing; and a keyboard coupled to the lower housing.

In numerous examples, the processing unit is further operable to cause a second actuator of the array of actuators to produce a second audio output in response to determining that the location of the touch is proximate to the first actuator; and modify the first audio output of the first actuator by causing the first actuator to cease producing the first audio output.

In various implementations, an electronic device includes a housing that defines an exterior surface of the electronic device, an audio sensor operable to sense a first audio output of the electronic device, an array of actuators positioned below a wall of the housing, and a processing unit operably coupled to the audio sensor and the array of actuators. The processing unit is operable to produce the first audio output using the array of actuators; monitor the first audio output using the audio sensor; determine if the first audio output is different from an expected audio output; and in response to determining that the first audio output is different from the expected audio output, modify an output of a first actuator to produce a second audio output that is different from the first audio output.

In some examples, the processing unit is operable to produce a haptic output using the array of actuators. In various such examples, the electronic device further includes a sensor operable to detect a location of a touch along the exterior surface and the processing unit is operable to produce the haptic output using a second actuator of the array of actuators in response to determining that the location of the touch is proximate to the second actuator. In some examples, the processing unit is operable to modify the output of the first actuator by adjusting a frequency or an amplitude of a signal provided to the first actuator.

In numerous examples, the electronic device further includes a keyboard and a trackpad and the array of actuators is operable to move a region of the wall of the housing adjacent to at least one of the keyboard or the trackpad to produce the first audio output or the second audio output. In some examples, the processing unit is operable to determine a location of a touch along the housing using a difference between the first audio output and the expected audio output. In various examples, the housing defines an array of thinned regions and one or more actuators of the array of actuators are coupled to a respective thinned region of the array of thinned regions.

In numerous implementations, an electronic device includes a housing that defines an exterior surface of the electronic device, a sensor operable to detect a touch along the exterior surface, an array of actuators positioned below a wall of the housing, and a processing unit operably coupled to the sensor and the array of actuators. The processing unit is operable to cause movement of a first region of the wall of the housing using the array of actuators to produce an audio output, detect the touch along the first region of the wall of the housing using the sensor; and cause movement of a second region of the wall of the housing using the array of actuators to produce the audio output in response to detecting the touch.

In various examples, the processing unit is operable to cease movement of the first region in response to detecting the touch. In numerous examples, the processing unit is operable to cause continued movement of the first region to produce the audio output upon detecting the touch.

In some examples, the processing unit is operable to cause movement of the first region to produce a haptic output in response to detecting the touch. In some such examples, the processing unit is operable to compare the audio output to an expected audio output and the processing unit is operable to cause the second region to produce an adjusted audio output in response to a determination that the audio output is different than the expected audio output. In various such examples, the adjusted audio output has a frequency range that is shifted with respect to the audio output.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Figure 1:
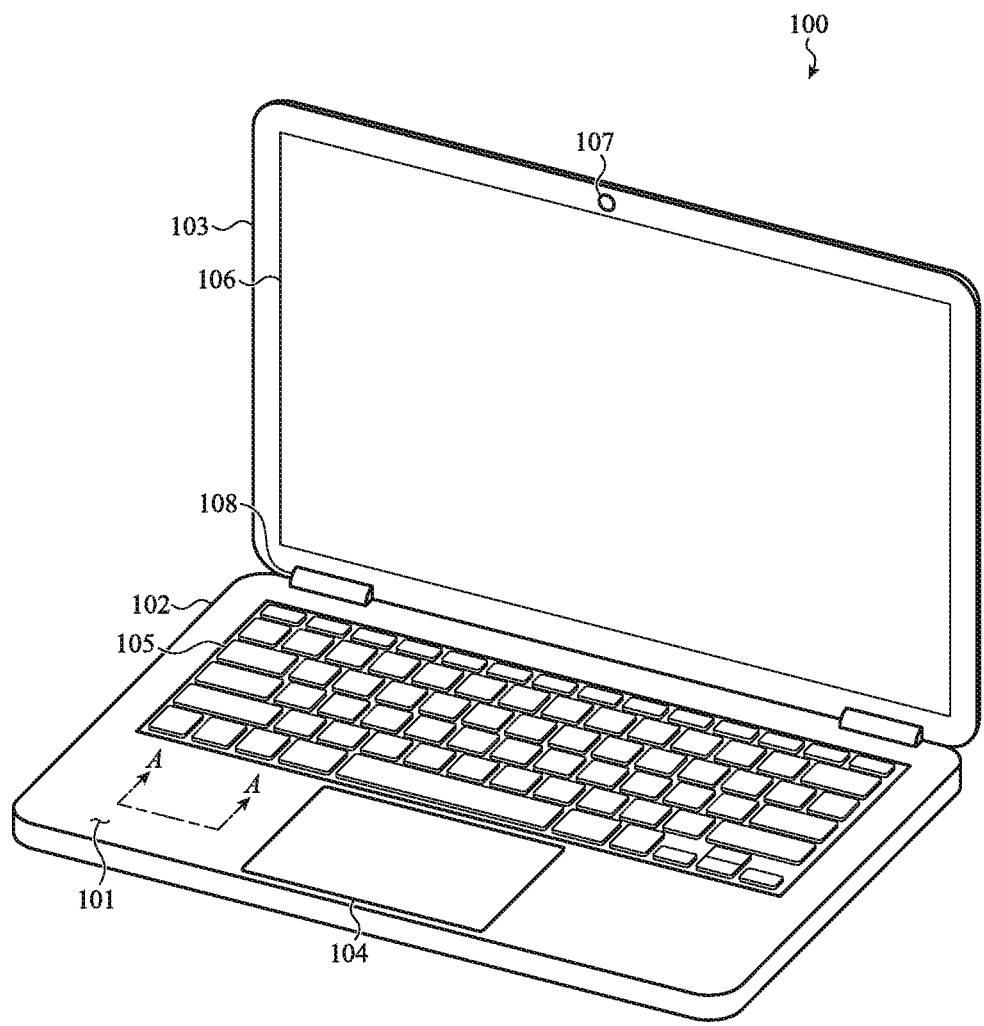
FIG. 1 depicts a first example of an electronic device that includes an array of acoustic/haptic actuators that use housing surfaces to produce sound and haptic output.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The description that follows includes sample systems, methods, and apparatuses that embody various elements of the present disclosure. However, it should be understood that the described disclosure may be practiced in a variety of forms in addition to those described herein.

The following disclosure relates to acoustic/haptic actuators (combined acoustic and haptic actuators) that use external housing surfaces to produce sound and haptic output. An electronic device has a housing that forms an exterior surface of the electronic device. An array of actuators is coupled to the housing and is operable to move the housing in order to produce sound waves and/or haptic output via the exterior surface. In this way, less space is consumed by acoustic and haptic devices as compared to similar conventional devices, thereby allowing for thinner electronic devices and/or room for other components within the housing.

The actuators may be operable to move different regions of the housing to produce sound waves within different frequency ranges, to produce haptic output and sound waves at different areas, and so on. For example, a first region may be used to produce sound waves within a first frequency range (such as a treble frequency range of approximately 2-17 kilohertz) and a second region may be used to produce sound waves within a second frequency range that is lower than the first frequency range (such as a bass frequency range of approximately 60 to 250 hertz). The second frequency range may be less affected by interference caused by an object positioned over and/or touching the second region. As such, the second region may be one on which a body part of a user is positioned when using an input device (such as a keyboard or trackpad). For example, the second region may include a palm rest area. By way of contrast, the first region may be one not typically touched by the user. The second region may also be larger than the first region.

The electronic device may include one or more sensors operable to detect proximity and/or touch of an object to the housing. Examples of such sensors include capacitive, resistive, optical, and other touch sensors, ambient light sensors, cameras, and so on. A processing unit of the electronic device may actuate individual actuators, or a subset of actuators, from the array of acoustic/haptic actuators based on the detected proximity and/or touch. For example, the electronic device may activate an actuator in a location where a touch is detected in order to produce haptic output, but not sound waves. Likewise, actuators around the detected touch location may produce sound waves but not haptic output. This may prevent a touch from interfering with produced sound and/or ensure that haptic output is only produced where a user can feel the haptic output.

The acoustic/haptic actuators may be operable to move the housing in at least two directions. For example, the acoustic/haptic actuators may move the housing either outward or inward to produce haptic output. However, the acoustic/haptic actuators may move the housing both outward and inward in order to produce audio as sound waves produced using a single direction of motion may not be acoustically pleasing to users.

In some implementations, the electronic device may monitor sound waves produced by the housing. For example, the electronic device may include one or more microphones or other sound or audio sensors, pressure sensors, or the like to sense the produced sound waves. If the produced sound waves are different than those the electronic device attempted to produce, the electronic device may adjust which of the array of acoustic/haptic actuators the electronic device is using to produce the sound waves. Alternatively and/or additionally, the electronic device may adjust the input waveform used to produce the sound waves. Any parameter of the input waveform may be adjusted, including amplitude and frequency, or a completely different waveform may be substituted.

In various implementations, the housing may be formed of any number of different materials. Examples of such materials include metal, plastic, glass, ceramic, and so on. In some examples, the housing may include one or more thinned regions (e.g., areas where the housing is thinner than adjacent areas). The acoustic/haptic actuators may be coupled to such thinned regions in order to more efficiently use the housing to produce sound waves or haptic output as thinner regions may consume less power to move than thicker areas, may recover more quickly, and so on.

In numerous implementations, the electronic device may use the acoustic/haptic actuators to produce sound waves and haptic output at different times. For example, the electronic device may alternate producing sound waves and haptic output. In other implementations, the electronic device may produce sound waves and haptic output simultaneously.

The acoustic/haptic actuators may be any of a variety of different kinds of actuators. In some implementations, the acoustic/haptic actuators may be electrodynamic transducers (such as voice coils), piezoelectric actuators, hydraulic or pneumatic actuators, magnetic actuators, other kinds of actuators, and/or a combination thereof.

These and other embodiments are discussed below with reference to FIGS. 1-16. However, those skilled in the art will readily appreciate that the detailed description given herein with respect to these Figures is for explanatory purposes only and should not be construed as limiting.

FIG. 1 depicts a first example of an electronic device 100 that includes an array of acoustic/haptic actuators that use housing surfaces to produce sound and haptic output. The electronic device 100 has a housing 101. The housing 101 forms an exterior surface of the electronic device 100, such as the portion of a lower housing 102 surrounding the keyboard 105 and trackpad 104. The electronic device 100 also includes an array of actuators coupled to and/or positioned below a wall of the housing 101 (see FIG. 2A). The actuators of the array of actuators are individually controllable to move the wall of the housing 101 in order to produce sound waves and/or haptic output via the exterior surface. As such, the electronic device 100 may omit separate speakers or similar components. Compared to similar conventional devices, less space is consumed by acoustic and haptic devices. This allows for thinner electronic devices and/or room for other components within the housing.

In various implementations, a processing unit of the electronic device 100 may control the actuators, or a subset of actuators, based on detected proximity and/or touch. For example, the processing unit may use one or more sensors to detect when the user and/or another object is proximate to and/or touching the housing 101. Examples of such sensors include the camera 107, capacitive sensors, optical sensors, ambient light sensors, cameras, and so on. The processing unit may detect the location of an object in order to adjust production of sound or haptic output based on the detected location. For example, touches to a region of the housing 101 may impair sound production using that region. When touch in a region is detected, the electronic device 100 may delay producing sound until the touch is no longer detected, use a different region to produce sound, and so on. By way of another example, haptic output may be discernible when a user is touching a region of the housing 101 where the haptic output is produced. As such, the electronic device 100 may produce haptic output at a location where the user is touching to avoid producing haptic output that the user cannot discern.

In numerous implementations, the electronic device 100 may use a feedback loop to ensure that audio produced using the housing 101 is the intended audio. The electronic device 100 may monitor audio output produced (such as by using one or more microphones or other audio detectors or audio sensors to sense audio output produced) and compare the sound to the audio the electronic device 100 attempted to produce. If the comparison indicates differences, the electronic device 100 may perform one or more adjustments. For example, the electronic device 100 may change which of the array of acoustic/haptic actuators the electronic device 100 is using to produce the sound waves, may alter one or more waveforms used to drive the actuators, and so on.

In some implementations, the electronic device 100 may be operable to independently move different regions of the wall of the housing 101. The electronic device 100 may move different regions to produce different haptic outputs at different areas, produce haptic output using a first region and sound waves using a second region, produce sound waves within different frequency ranges, and so on.

For example, the electronic device 100 may use a first group of actuators of an array of actuators to move a first group of regions of a housing to produce a high-frequency audio output having a first frequency range (such as between about 2 and 20 kilohertz) and a second group of actuators to move a second group of regions of the housing to produce a low-frequency audio output having a second frequency range that is different than the first frequency range (such as between about 0 and 2 kilohertz). Each region of the first group of regions may be smaller than each region of the second group of regions. The first frequency range may be higher than the second frequency range.

The second frequency range may be less affected by interference caused by an object touching the second region, such as where the second frequency range is less directionally dependent than the first frequency range. As such, the electronic device 100 may produce the first frequency range using regions not typically touched by a user in order to prevent interference. Similarly, the electronic device 100 may produce the second frequency range using regions that may be touched when an input device (such as a keyboard 105 or a trackpad 104) is in use because the touch may not significantly affect production of the second frequency range.

In some implementations, the regions may be different sizes. For example, larger regions may generally produce lower frequency sound waves better than smaller regions. As such, the second region may be larger than the first region.

For example, in some implementations, the wall of the lower housing 102 may be used to produce a bass frequency range (such as approximately less than 250 hertz) and a display 106 in an upper housing 103 (and/or an area of the wall of the upper housing 103 around the display 106) may be used to produce a treble frequency range (such as approximately greater than 2 kilohertz). The display 106 may typically point towards a user during use and may not typically be touched, preventing interference with the treble frequency range. The bass frequency range may not be as directionally dependent as the treble frequency range and may not be as affected by touch, so it may not matter whether or not the user touches the lower housing 102. In this way, both bass and treble components of audio may be produced while allowing large areas of the exterior of the electronic device 100 to be used for audio production.

Although FIG. 1 illustrates use of the wall of the housing 101 to produce sound waves and/or haptic output, it is understood that this is an example. In various implementations, any exterior portion of the electronic device 100 may be used in this way. For example, a portion of an upper housing 103 may be used, such as the outer surface opposite from an inner surface where a display 106 is positioned. The outer surface of the upper housing 103 may be exposed even when the electronic device 100 is closed, obscuring the display 106 and an inner surface of the lower housing 102, allowing the outer surface to remain available for producing sound waves and/or providing haptic output. For example, haptic output may be provided via the upper housing 103 when the electronic device is connected to and/or disconnected from a dedicated power connection. By way of another example, the upper housing 103 may be moved by one or more actuators connected thereto in order to produce sound waves when the electronic device 100 is closed, which may block, attenuate, or otherwise muffle audio produced by actuators within the lower housing 102.

Figure 2A:
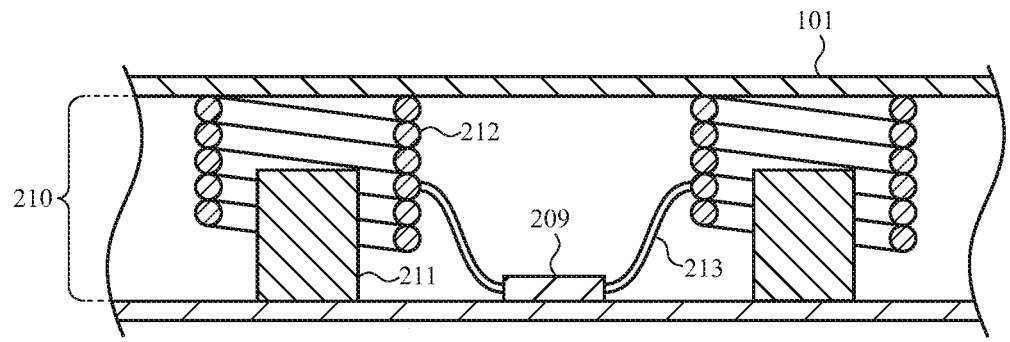
FIG. 2A depicts a cross-sectional view of a first example implementation of the acoustic/haptic actuators of the electronic device of FIG. 1, taken along line A-A of FIG. 1.

FIG. 2A depicts a cross-sectional view of a first example implementation of the acoustic/haptic actuators 210 of the electronic device 100 of FIG. 1, taken along line A-A of FIG. 1. In this first example implementation, the acoustic/haptic actuators 210 may be electrodynamic transducers (one example of which may be a voice coil). The acoustic/haptic actuators 210 may each include a magnet 211 and a coil 212 coupled to the housing 101 (such as via adhesive, by embedding a portion of the coil 212 within the housing 101, and so on). Application of alternating current to the coil 212 may cause the coil 212 to generate magnetic fields of alternating polarity. The magnetic field of the coil 212 may interact with the magnetic field of the magnet 211. This may cause the coil 212 to move, thus moving the wall of the housing 101. (References to a "housing" with respect to FIGS. 2A-16 are intended to embrace any housing of an electronic device, whether upper, lower, front, back, side, and so on.)

In some implementations, the magnet 211 may also move. In such implementations, the magnet 211 may move in addition to the housing 101 to produce sound waves and/or haptic output. In other implementations, the magnet 211 may be fixed so that the magnet 211 does not move. For example, a substrate to which the magnet 211 is fixed may be more rigid than the housing 101 (such as by being thicker than the housing 101, by being formed of a less flexible material than the housing 101, or the like) so that the magnet 211 does not move when the coil 212 moves.

A processing unit 209 (or other processor or controller) may be operable control the acoustic/haptic actuators 210. The processing unit 209 may be electrically connected to the coil 212 and/or other portion of the acoustic/haptic actuators 210 by an electrical connector 213, such as a flex or other connector.

Figure 2B:
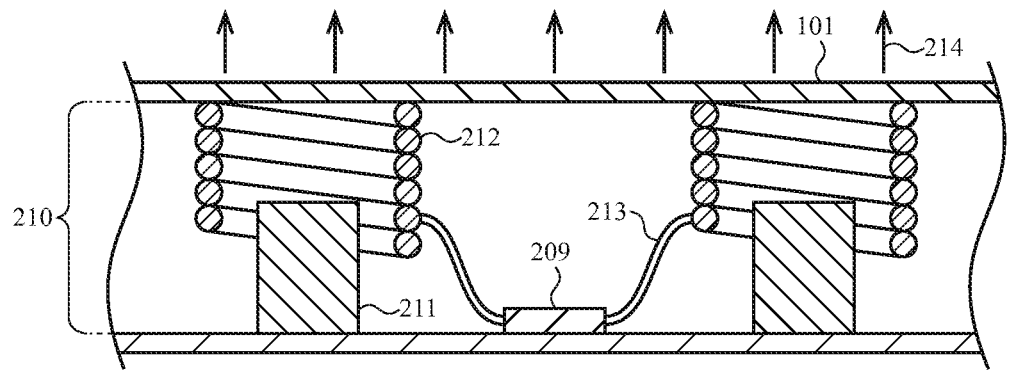
FIG. 2B depicts the acoustic/haptic actuators of FIG. 2A moving a housing in a first direction.
Figure 2C:
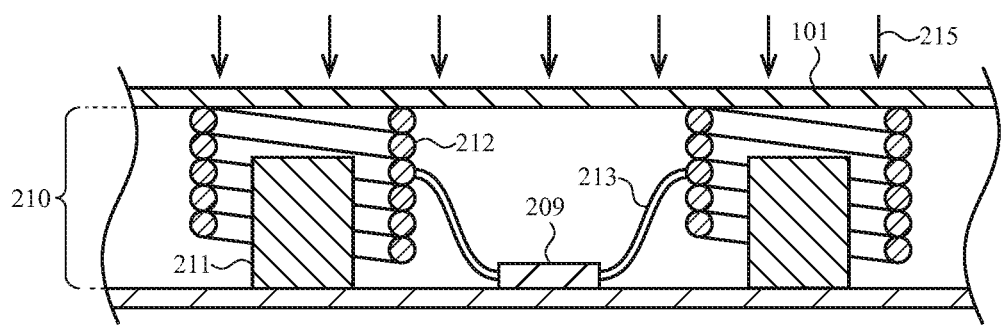
FIG. 2C depicts the acoustic/haptic actuators of FIG. 2B moving the housing in a second direction.

The acoustic/haptic actuators 210 may be operable to move the wall of the housing 101 in at least two directions (e.g., bidirectionally and/or in a first direction and a second, opposing direction). FIG. 2B depicts the acoustic/haptic actuators 210 moving the wall of the housing 101 in a first (or outward) direction 214. FIG. 2C depicts the acoustic/haptic actuators 210 then moving the wall of the housing 101 in a second (or inward) direction 215.

For example, the acoustic/haptic actuators 210 may move the wall of the housing 101 either outward or inward (e.g., in a single direction) to produce haptic output. However, the acoustic/haptic actuators 210 may move the wall of the housing 101 both outward and inward in order to produce audio, as sound waves produced using a single direction of motion typically are not pleasing to users. Further, bidirectional movement of the wall of the housing 101 may allow for more rapid oscillation, quicker recovery, generation of a broader range of frequencies (particularly higher frequencies), and so on.

Figure 3:
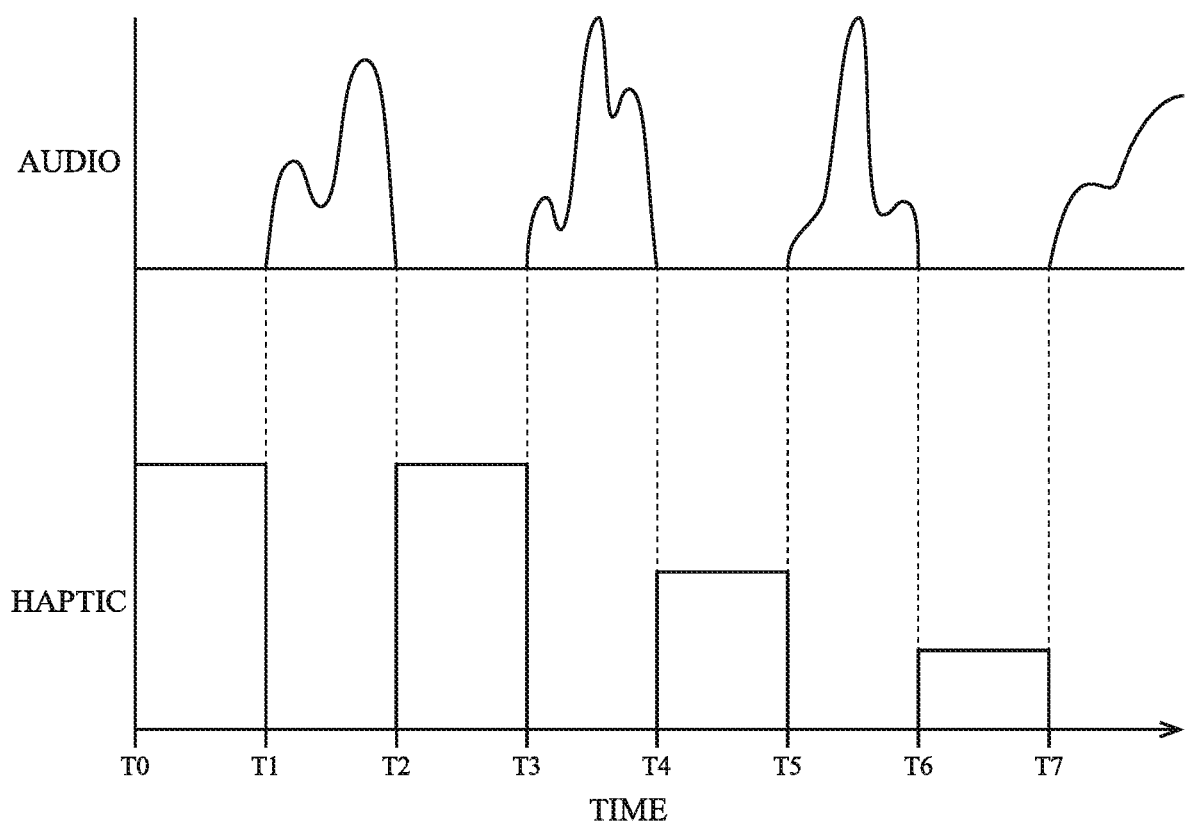
FIG. 3 depicts example audio and haptic waveforms that may be applied to an acoustic/haptic actuator to produce sound and haptic output at alternating times.

In some implementations, audio and haptic waveforms may be combined and applied to cause the acoustic/haptic actuators 210 to move the same portion of the housing 101 in order to produce both sound and haptic output. FIG. 3 depicts example audio and haptic waveforms that may be applied to an acoustic/haptic actuator to produce sound and haptic output at alternating times. As the sound and haptic output are produced alternatingly, the same portion of the housing 101 may be moved to both produce sound and haptic output. The alternating time periods may be sufficiently brief (such as a fraction of a second) that a user perceives the sound and haptic output at the same time even though the two alternate.

When an electronic device determines to use the same housing portion to output both sound and haptic output, the electronic device may generate such a combined waveform and apply it to one or more acoustic/haptic actuators. In some examples, the electronic device may obtain or generate separate audio and haptic waveforms, determine the length of time periods that will allow the two waveforms to not interfere with each other while appearing simultaneous to a user, generate a combined waveform by interleaving the separate audio and haptic waveforms according to the determined time period length, and apply the combined waveform to the acoustic/haptic actuator. In other examples, the electronic device may omit generating the combined waveform and instead apply alternating sections of the separate audio and haptic waveforms to the acoustic/haptic actuator at the corresponding time period for that section as if the separate audio and haptic waveforms had been interleaved.

As shown, the haptic waveform may have pulses between times T0 and T1, T2 and T3, T4 and T5, and T6 and T7. As also shown, the amplitude of the audio waveform may be between times T1 and T2, T3 and T4, T5 and T6, and after T7. As such, the audio and haptic waveforms may be time multiplexed as their amplitudes alternate at non-overlapping times. This may prevent interference between audio and haptic production while resulting in a user perception of simultaneous sound and haptic output.

As shown, the amplitude of the haptic waveform at time T0 and T1 is the same as at time T2 and T3 whereas the amplitude at time T4 to T5 is lower, and lower still at time T6 to T7. This may function as a "ring down," ensuring that a user stops feeling a haptic output at a time controlled by the electronic device. Accordingly, it should be appreciated that amplitude of a haptic output may vary.

Although FIG. 3 depicts example audio and haptic waveforms that time multiplex sound and haptic production, it is understood that this is an example. In some implementations, overlapping audio and haptic waveforms of different frequencies may be used to frequency multiplex audio and haptic production. In such an implementation, audio and haptic production may occur simultaneously.

Although FIGS. 2A-2C illustrate the acoustic/haptic actuators 210 as electrodynamic transducers, it is understood that this is an example. In other implementations, the acoustic/haptic actuators 210 may be other kinds of actuators without departing from the scope of the present disclosure.

Figure 4:
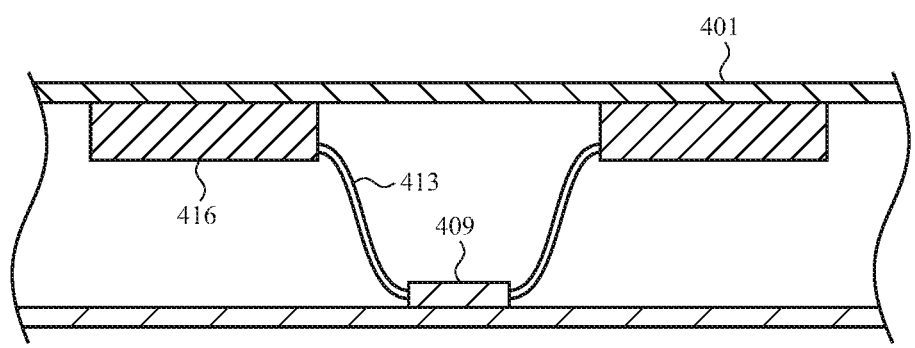
FIG. 4 depicts a second example implementation of the acoustic/haptic actuators of FIG. 2A.

For example FIG. 4 depicts a second example implementation of the acoustic/haptic actuators 416. In this example, the acoustic/haptic actuators 416 may be piezoelectric actuators. The acoustic/haptic actuators 416 may include one or more layers of piezoelectric material (such as lead zirconate titanate, potassium-based piezoelectric materials such as potassium-sodium niobate, and/or any other suitable piezoelectric material). The piezoelectric material may be operable to flex when current is applied by a processing unit 409 via an electrical connector 413, thus causing the wall of the housing 401 to move.

In some implementations, the acoustic/haptic actuators 416 may include a first layer of piezoelectric material that may be configured to flex in a first direction and a second layer of piezoelectric material that may be configured to flex in a second, opposing direction. In this way, bidirectional movement may be possible using multiple layers of piezoelectric material.

As discussed above, an electronic device having acoustic and haptic actuators coupled to a housing may include one or more sensors operable to detect proximity and/or touch of an object to the housing. In some implementations, the sensor may be a capacitive touch sensing layer.

Figure 5A:
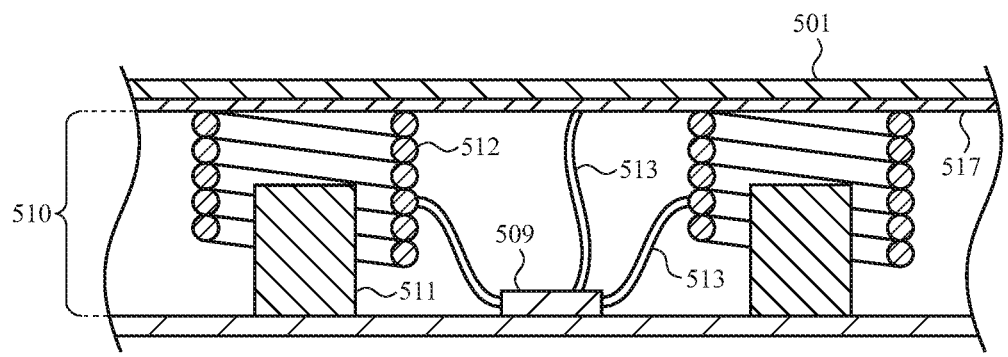
FIG. 5A depicts a third example implementation where a capacitive touch sensing layer is coupled to the housing.

For example, FIG. 5A depicts a third example implementation where a capacitive touch sensing layer 517 may be coupled to the housing 501. The capacitive touch sensing layer 517 may be operable to detect touch and/or proximity of an object (such as a body part of a user) to one or more regions, areas, or portions of the housing 501. The capacitive touch sensing layer 517 and/or another sensor (such as a force sensor) may also be operable to detect an amount of applied force corresponding to a touch. Touch, force, and/or proximity may be detected in order to alter control of the acoustic/haptic actuators 510. For example, acoustic/haptic actuators 510 may be used to move the wall of the housing 501 at a location that is not currently being touched in order to produce sound. The capacitive touch sensing layer 517 may be controlled by a processing unit 509, which may be connected to the capacitive touch sensing layer 517 by an electrical connector 513. As shown, the coils 512 of the acoustic/haptic actuators 510 may be coupled to and/or positioned below the wall of the housing 501 via the capacitive touch sensing layer 517. Thus, the acoustic/haptic actuators 510 may move the capacitive touch sensing layer 517 as well as the wall of the housing 501.

Figure 5B:
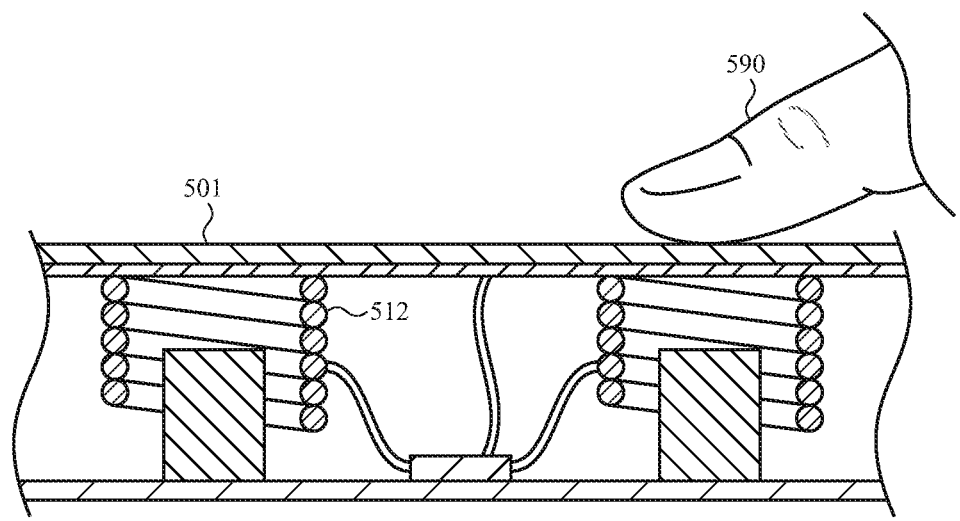
FIG. 5B depicts a user touching a portion of the housing of the third example implementation of FIG. 5A.

As discussed above, the acoustic/haptic actuators 510 may be controlled using a touch on the housing 501 detected using the capacitive touch sensing layer 517 to produce localized deflections by moving portions of the housing 501. For example, FIG. 5B illustrates a user 590 touching a portion of the housing 501. The coils 512 may be controlled to move one or more different portions of the housing 501 for a number of different purposes in response to and/or taking into account the touch of the user 590.

Figure 5C:
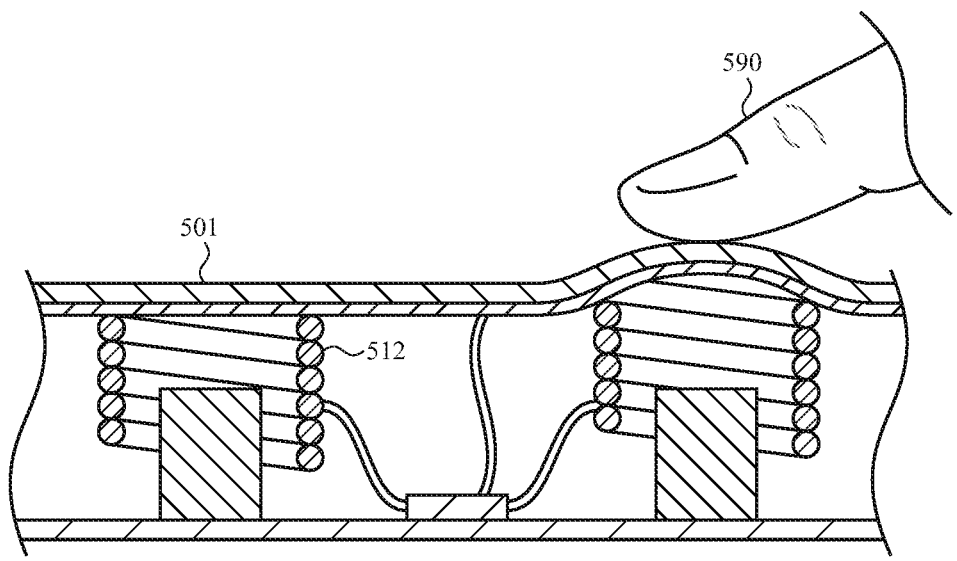
FIG. 5C depicts a first example localized deflection that may be produced in response to the touch illustrated in FIG. 5B.

For example, FIG. 5C depicts a first example localized deflection that may be produced in response to the touch illustrated in FIG. 5B. In this example, the housing 501 may be moved to create a haptic output at a location of the detected touch. As illustrated, the coil 512 under where the user 590 is touching may move the housing 501. This produces the localized deflection where the user 590 is touching. Thus, the user 590 will feel the haptic output as opposed to a situation where the localized deflection had been produced where the user 590 was not touching.

Alternatively, the housing 501 may be used to produce sound that would not be affected by a touch of the user 590. For example, moving the housing 501 to produce sound in lower frequency ranges at a location touched by the user 590 may produce sound substantially equivalent to moving an untouched location of the housing 501. As such, the localized deflection may be produced at the location shown even though the user 590 is touching that location.

By way of another example, the housing 501 may be used to produce sound that would be affected by a touch of the user 590. For example, moving the housing 501 to produce sound in higher frequency ranges at a location touched by the user 590 may cause the produced sound to be dampened, attenuated, or the like. As such, the housing 501 may be moved to produce the sound at locations other than where the touch is detected in order to prevent the touch from affecting the produced sound.

Figure 5D:
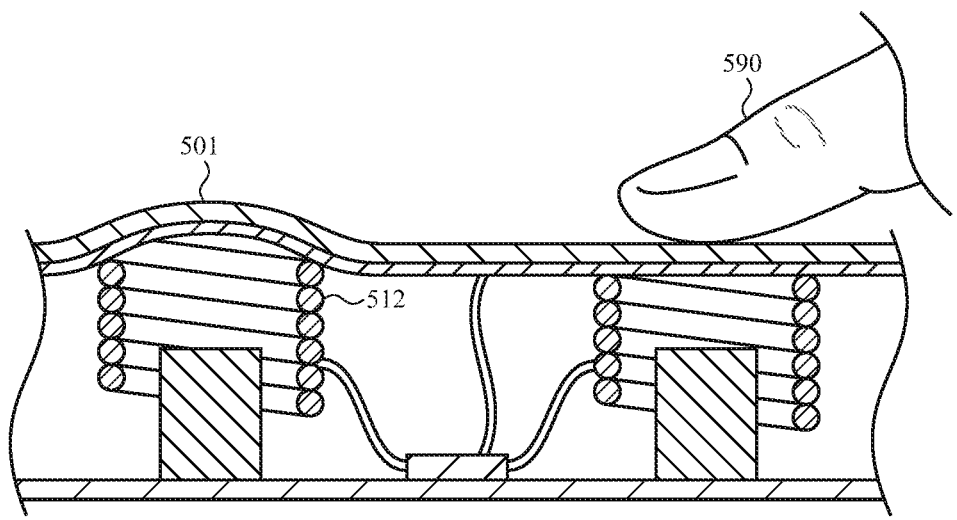
FIG. 5D depicts a second example localized deflection that may be produced in response to the touch illustrated in FIG. 5B.

For example, FIG. 5D depicts a second example localized deflection that may be produced in response to the touch illustrated in FIG. 5B. In this example, the housing 501 may be moved to produce sound at a location other than that of the detected touch. As illustrated, the coil 512 under where the user 590 is not touching may move the housing 501. This produces the localized deflection where the user 590 is not touching. Thus, the touch of the user 590 may not affect the produced sound.

FIGS. 2A-2C, 4, and 5A-5D illustrate the housing 101, 401, 501 as having a uniform thickness. However, it is understood that this is for the sake of simplicity. In various implementations, the housing 101, 401, 501 may include one or more thinned regions, or areas where the housing is thinner than other areas. The acoustic/haptic actuators 210, 416, 510 may be coupled to such thinned regions in order to more efficiently use the housing 101, 401, 501 to produce sound waves or haptic output.

Figure 6:
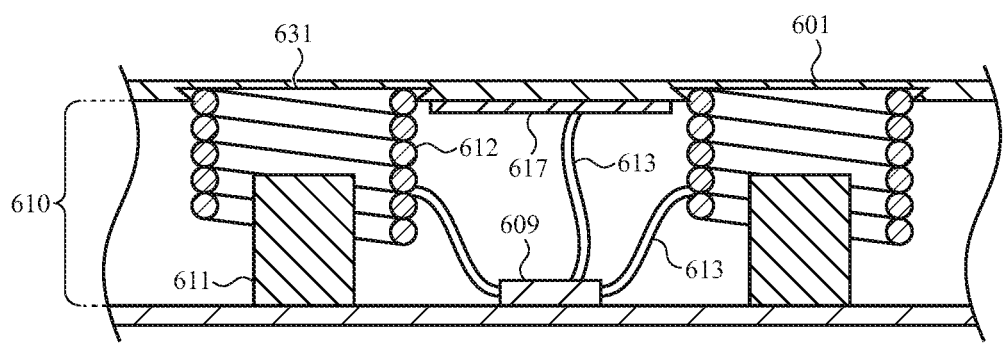
FIG. 6 depicts a fourth example implementation where the acoustic/haptic actuators are coupled to thinned regions.

For example, FIG. 6 depicts a fourth example implementation where the acoustic/haptic actuators 610 are coupled to thinned regions 631. Contrasted with FIG. 5, the capacitive touch sensing layer 617 may not extend across the entirety of the housing 601. Instead, the capacitive touch sensing layer 617 may be coupled to and/or positioned below the wall of the housing 601 outside of the areas where the acoustic/haptic actuators 610 couple to the housing 601. Further, the housing 601 may include a number of thinned regions 631 where the acoustic/haptic actuators 610 are coupled.

The thinned regions 631 may be more flexible than the rest of the housing 601 due to being thinner than the rest of the housing 601. As such, movement of the thinned regions 631 may be performed more quickly than movement of other regions of the housing 601, recover from movement more quickly than movement of other regions of the housing 601, consume less power than movement of other regions of the housing 601, allow more space for the acoustic/haptic actuators 610 or other components than other regions of the housing 601, and so on.

Further, the thinned regions 631 may define a shape on an interior surface of the housing 601. This shape may affect the resonant frequency of the thinned regions 631, tuning the thinned regions 631 to enhance audio and/or haptic production at particular frequency ranges. For example, a first shape may be used to enhance production of treble audio and a second shape may be used to enhance production of bass audio. In various implementations, the shape may allow the thinned regions 631 to perform similar acoustic functions to the cone or back volume of a speaker.

As discussed above, the acoustic/haptic actuators 610 may be operable using the magnets 611 and coils 612 to move different regions of the housing 601 to produce sound waves (and/or haptic output) within different frequency ranges, such as a first region used to produce sound waves within a first frequency range and a second region used to produce sound waves within a second frequency range that is lower than the first frequency range.

FIGS. 2A-2C, 4, and 5A-5D illustrate examples where the acoustic/haptic actuators 210, 416, 510, 610 are identical to each other. However, it is understood that this is for the sake of simplicity. In various implementations, acoustic/haptic actuators 210, 416, 510, 610 that are different from each other may be used. For example, different acoustic/haptic actuators 210, 416, 510, 610 may be configured to produce sound at different frequency ranges.

Figure 7:
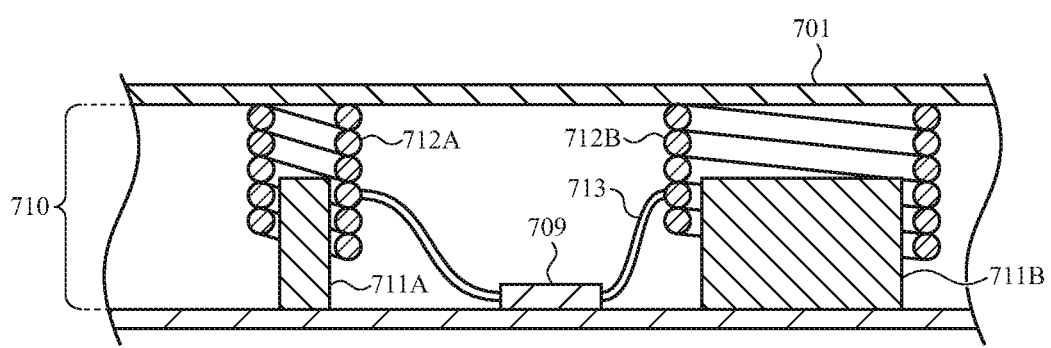
FIG. 7 depicts a fifth example implementation with differing acoustic/haptic actuators.

For example, FIG. 7 depicts a fifth example implementation with differing acoustic/haptic actuators 710. As shown, the left magnet 711A and coil 712A have substantially smaller diameters than the right magnet 711B and coil 712B. This may allow the left magnet 711A and coil 712A to move the wall of the housing 701 to produce sound at higher frequency ranges than the right magnet 711B and coil 712B due to the smaller diameter. Similarly, this may allow the right magnet 711B and coil 712B to move the housing 701 to produce sound at lower frequency ranges than the left magnet 711A and coil 712A due to the larger diameter. As such, a processing unit 709 may control the left magnet 711A and coil 712A (via electrical connectors 713) to produce higher frequency sound and the right magnet 711B and coil 712B to produce lower frequency sound.

FIG. 6 illustrates an example where the thinned regions 631 are identical to each other. However, it is understood that this is for the sake of simplicity. In various implementations, thinned regions 631 that are different from each other may be used. For example, different thinned regions 631 may be configured for producing sound at different frequency ranges.

Figure 8:
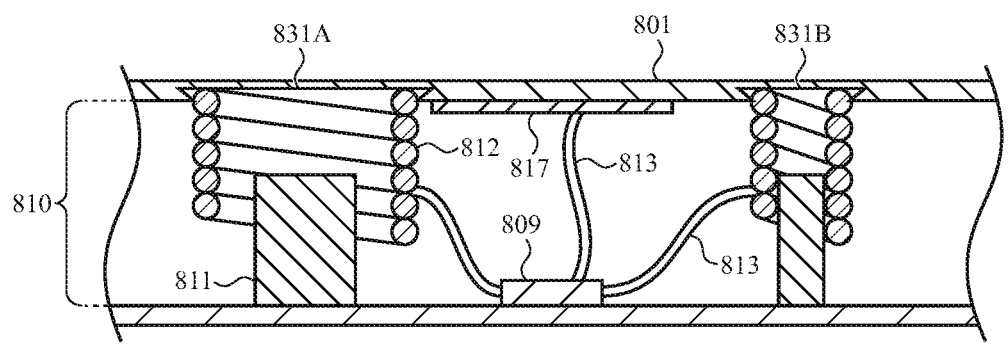
FIG. 8 depicts a sixth example implementation with differing thinned regions.

For example, FIG. 8 depicts a sixth example implementation. Similar to the example shown in FIG. 6, this sixth example implementation includes a housing 801 with differing thinned areas, acoustic/haptic actuators 810 (including coils 812 and magnets 811), and a capacitive touch sensing layer 817 connected to a processing unit via an electrical connector 813. As shown, a left thinned region 831A may be shaped so that it is twice as wide as a right thinned region 831B. This may cause the left thinned region 831A to define a shaped back volume that is configured to produce sound at lower frequency ranges than the right thinned region 831B. As such, a respective acoustic/haptic actuator associated with the left thinned region 831A may be used when producing lower frequency sound. Similarly, a respective acoustic/haptic actuator associated with the right thinned region 831B may be used when producing higher frequency sound.

Figure 9A:
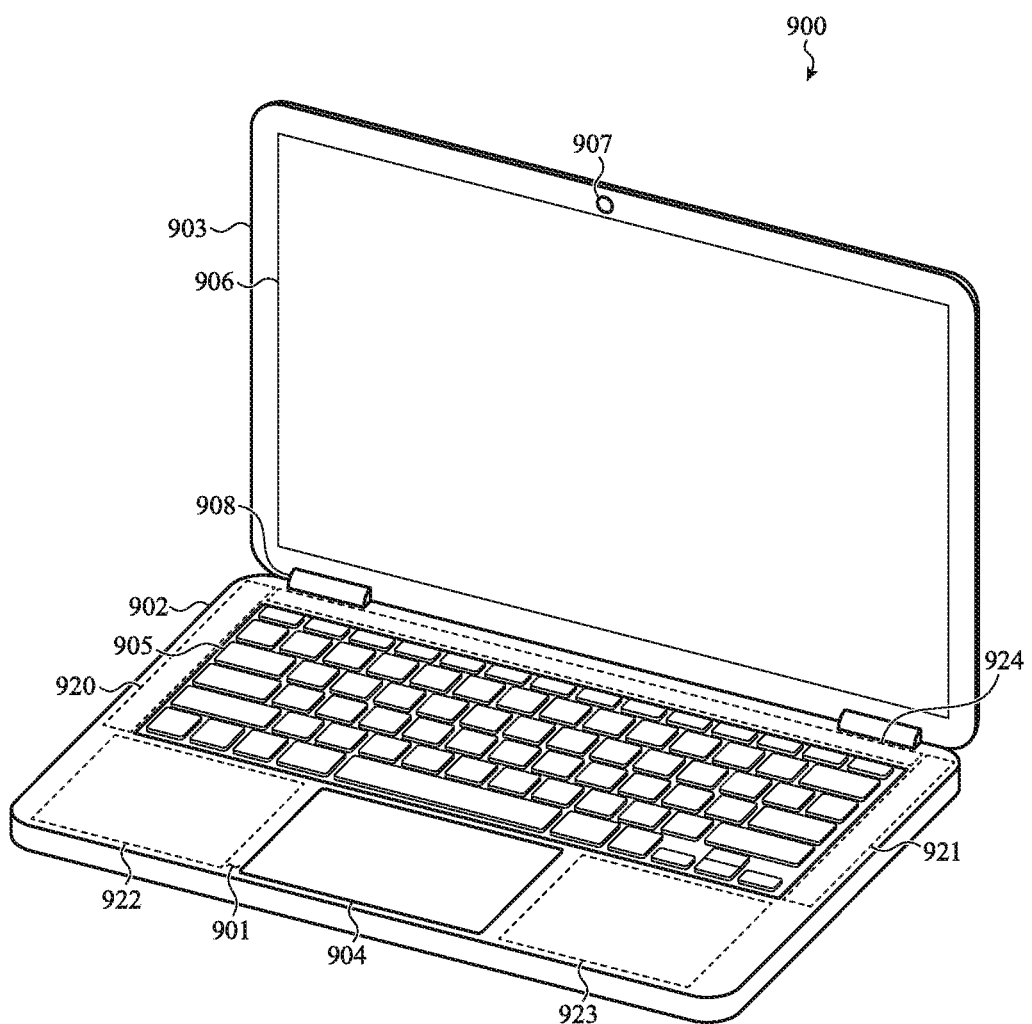
FIG. 9A depicts a second example of the electronic device of FIG. 1 that includes multiple acoustic/haptic actuator housing regions.

For example, FIG. 9A depicts a second example of the electronic device 900 that includes multiple acoustic/haptic actuator housing regions 920-924 in a housing 901 that includes a lower housing 902 hingedly and/or pivotably coupled to an upper housing 903 by a hinge 908. The electronic device 900 may independently control the multiple acoustic/haptic actuator housing regions 920-924 to produce sound waves of different frequencies (and/or haptic output).

In some examples, the electronic device 900 may control the acoustic/haptic actuator housing regions 920, 921, and 924 to produce first sound waves that are within a first frequency range and the acoustic/haptic actuator housing regions 922 and 923 to produce second sound waves that are within a second frequency range (for example, lower than the first frequency range). As such, the multiple acoustic/haptic actuator housing regions 920-924 may be used in a combined acoustic output system, such as where the acoustic/haptic actuator housing regions 920, 921, and 924 are used as tweeters (e.g., used to produce audio at frequencies between approximately 2000-20,000 hertz) and the acoustic/haptic actuator housing regions 922 and 923 are used as woofers (e.g., used to produce audio at frequencies between approximately 40-500 hertz).

The electronic device 900 may control the acoustic/haptic actuator housing regions 920-924 in this way because the acoustic/haptic actuator housing regions 922 and 923 may frequently be covered or touched by a user's hand when the keyboard 905 and/or trackpad 904 are in use. For example, a user may rest their palm on the acoustic/haptic actuator housing regions 922 and 923 when using the keyboard 905 or trackpad 904. Conversely, the acoustic/haptic actuator housing regions 920, 921, and 924 are not covered or touched by a user's hand when the keyboard 905 and/or trackpad 904 are in use. As touch may adversely impact tweeter function more than woofer function due to the higher frequency range involved, use of the acoustic/haptic actuator housing regions 922 and 923 as woofers and the acoustic/haptic actuator housing regions 920, 921, and 924 as tweeters may allow a full range of audio production despite possible touches to the acoustic/haptic actuator housing regions 922 and 923 related to use of the keyboard 905 or trackpad 904.

Figure 9B:
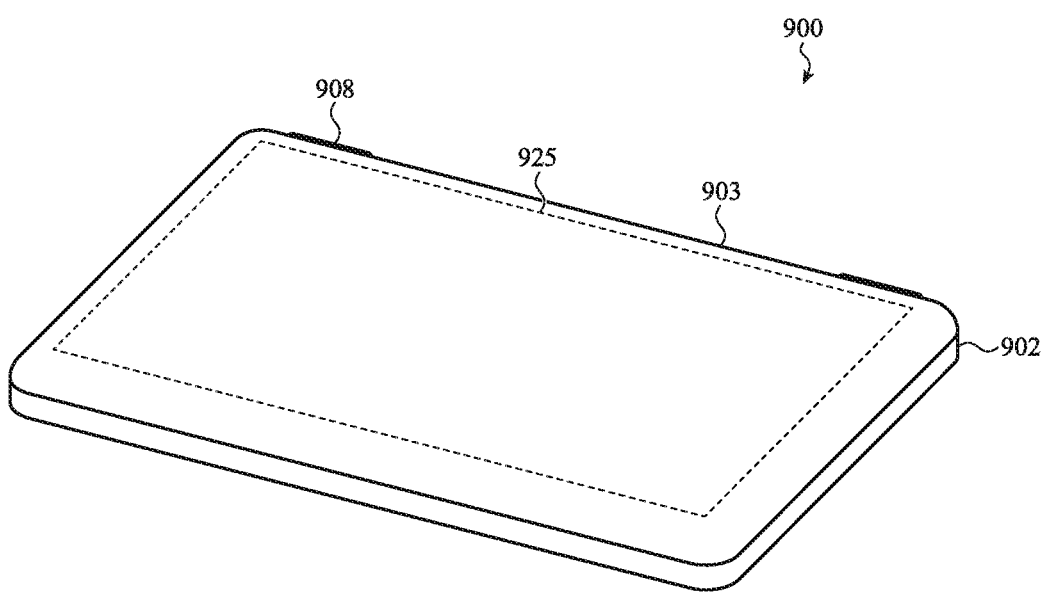
FIG. 9B depicts the electronic device of FIG. 9A in a closed configuration.

FIG. 9B depicts the electronic device 900 of FIG. 9A in a closed configuration (as compared to the open configuration shown in FIG. 9A). The upper housing 903 includes an outer surface (opposite the display 906 and the camera 907 shown in FIG. 9A) that is exposed when the electronic device 900 is in the closed configuration. The outer surface includes an acoustic/haptic actuator housing region 925. The electronic device 900 may use the acoustic/haptic actuator housing region 925 to produce sound waves and/or haptic output when the electronic device 900 is in the closed configuration and the acoustic/haptic actuator housing regions 920-924 may be blocked, attenuated, or otherwise muffled by the upper housing 903.

In some embodiments, the processing unit may actuate a subset of actuators based on whether the electronic device 900 is open or closed, in order to ensure the actuators producing sound and/or haptics are coupled to an exterior surface of the device, for example, if the electronic device, the portion of the housing surrounding the trackpad 904 and/or keyboard 905 may be covered and inaccessible by a user. In such a case, the processing unit may actuate a subset of actuators still coupled to exterior surfaces of the device (e.g., surfaces of the electronic device 900 not covered by other portions of the device, or that are otherwise physically accessible by a user) to produce audio and/or haptic output.

In some implementations, the electronic device 900 may use the acoustic/haptic actuator housing region 925 to produce sound waves and/or haptic output when the electronic device 900 is in the open configuration as well. For example, the electronic device 900 may use the acoustic/haptic actuator housing region 925 to produce bass audio frequencies and the acoustic/haptic actuator housing regions 920, 921, and 924 to produce treble audio frequencies. This may allow a large surface for production of the bass audio frequencies, which may suffer less from being oriented away from a user than the treble audio frequencies.

Figure 10:
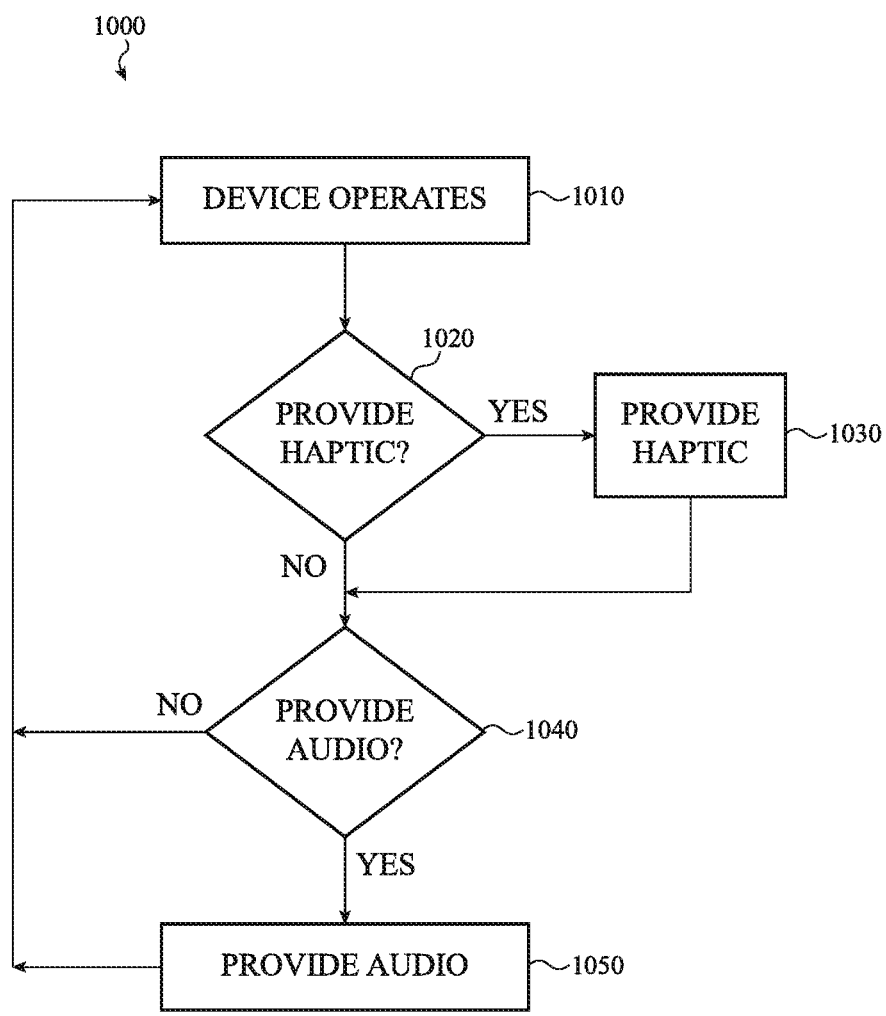
FIG. 10 depicts a flow chart illustrating a first example method for operating acoustic/haptic actuators.

FIG. 10 depicts a flow chart illustrating a first example method 1000 for operating acoustic/haptic actuators. The method 1000 may be performed by one or more of the electronic devices and/or acoustic/haptic actuators of FIGS. 1-2C and 4-9B.

At 1010, an electronic device having acoustic/haptic actuators that use external housing surfaces to produce sound and haptic output operates. The flow proceeds to 1020 where the electronic device determines whether or not to produce haptic output. If so, the flow proceeds to 1030 where the electronic device uses the acoustic/haptic actuators to move the external housing surface to produce the haptic output before the flow proceeds to 1040. Otherwise, the flow proceeds directly to 1040.

At 1040, the electronic device determines whether or not to produce audio. If so, the flow proceeds to 1050 where the electronic device uses the acoustic/haptic actuators to move the external housing surface to produce the audio before the flow returns to 1010 where the electronic device continues to operate. Otherwise, the flow returns directly to 1010.

Although the example method 1000 is illustrated and described as including particular operations performed in a particular order, it is understood that this is an example. In various implementations, various orders of the same, similar, and/or different operations may be performed without departing from the scope of the present disclosure.

For example, the example method 1000 is illustrated and described as first determining whether or not to produce haptic output and then determining whether or not to produce audio. However, it is understood that this is an example. In other implementations, the decisions may be reversed. In still other implementations, the decisions may be performed simultaneously and/or in various non-linear or other orders. Various configurations are possible and contemplated without departing from the scope of the present disclosure.

The techniques described above enable housings that are operable to perform multiple functions relating to production of haptics and/or sound (or sound waves). The sound or haptics that such multiple function housings may generate may be adjusted for a variety of different operating conditions, in response to one or more touches, and so on. As a result, these multiple function housings may be flexible enough to perform a variety of different ways in a variety of different situations.

Figure 11:
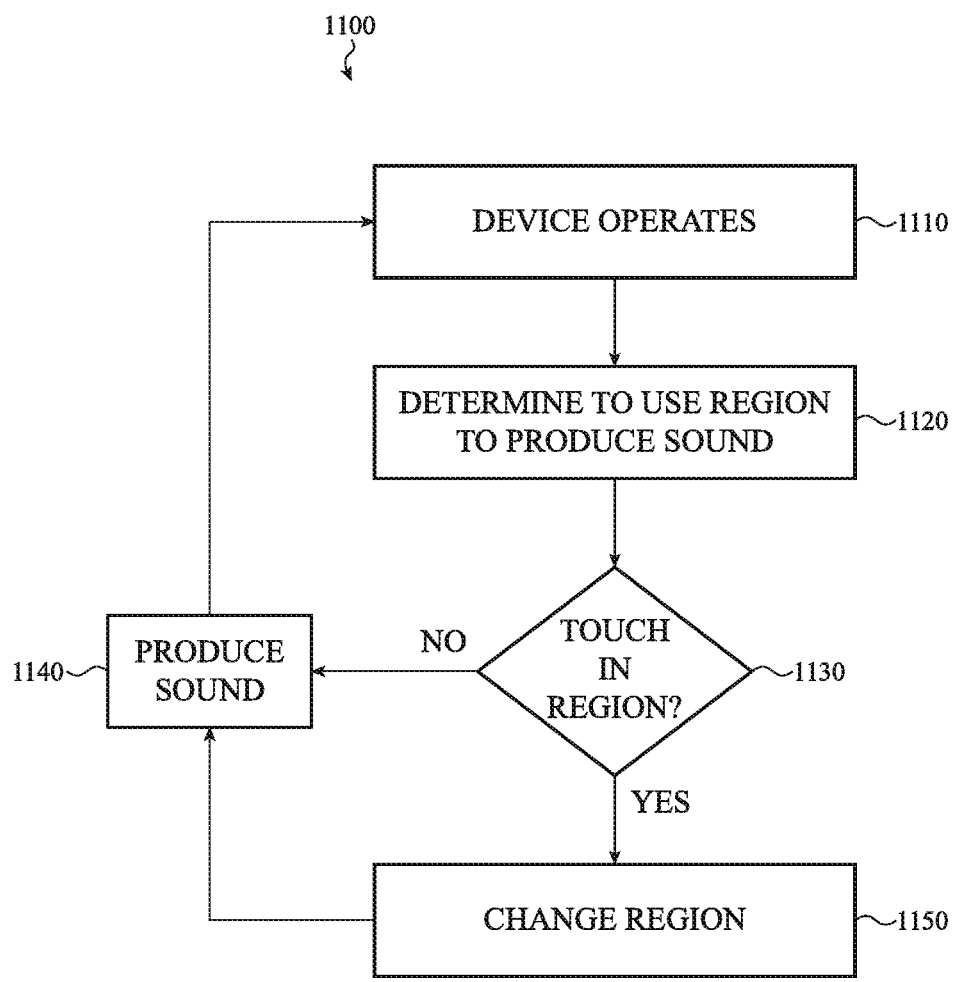
FIG. 11 depicts a flow chart illustrating a second example method for operating acoustic/haptic actuators.

For example, FIG. 11 depicts a flow chart illustrating a second example method 1100 for operating acoustic/haptic actuators. The method 1100 may be performed by one or more of the electronic devices and/or acoustic/haptic actuators of FIGS. 1-2C and 4-9B.

At 1110, an electronic device operates. The flow proceeds to 1120 where the electronic device determines to move a region of a housing to produce sound. Next, the flow proceeds to 1130 where the electronic device determines whether or not there is currently a touch in the determined region.

For example, the electronic device may include a capacitive touch sensor disposed within the housing. In such an example, the electronic device may determine whether or not there is currently a touch in the determined region using one or more capacitance changes detected by the capacitive touch sensor. By way of another example, the electronic device may include a camera operable to capture one or more images of the determined region. In such an example, the electronic device may determine whether or not there is currently a touch in the determined region by analyzing the image to determine if an object is blocking the determined region. In yet another example, the electronic device may move the determined region and analyze whether or not the determined region moves as expected in order to determine whether or not there is currently a touch in the determined region. In some implementations of such an example, the electronic device may move the determined region to produce the sound, compare the audio output the electronic device attempted to produce using a microphone or similar sound sensing mechanism or audio sensor, and determine there is currently a touch in the determined region if the monitored audio output differs from the expected audio output.

If the electronic device determines there is a touch in the determined region, the flow proceeds to 1150 where the electronic device changes the region. Otherwise, the flow proceeds to 1140 where the electronic device produces the sound. The flow may then return to 1110 where the electronic device continues to operate.

In examples where the electronic device changes the region, the electronic device may change the region to an adjacent region, a region that the electronic device is not currently being touched, another region that has similar characteristics to the determined region (such as another region configured to produce high frequency sound ranges when the sound the electronic device is to produce is in the high frequency sound range, another region configured to produce low frequency sound ranges when the sound the electronic device is to produce is in the low frequency sound range, or the like), and so on. The flow may then proceed to 1140 where the electronic device produces the sound using the changed region.

For example, a processing unit of an electronic device may move a first region of a wall of a housing using an array of actuators to produce an audio output. The processing unit may detect a touch along the first region of the housing using a sensor, cease moving the first region, and move a second region of the wall of the housing using the array of actuators to produce the audio output at least in response to detecting the touch. The processing unit may also provide a haptic output by moving the first region using the array of actuators in response to detecting the touch.

In some implementations, the processing unit moves the second region to produce the audio output upon detecting the touch and determining the touch affects production of the audio. For example, the processing unit may determine whether the touch affects the production of the audio by determining whether audio corresponding to the audio output is below a frequency threshold. By way of another example, the processing unit may determine whether the touch affects the production of the audio by determining whether the audio output is different from an expected audio output. Conversely, the processing unit may continue moving the first region to produce the audio output upon detecting the touch and determining the touch does not affect production of the audio output.

In various implementations, the processing unit is operable to cause movement of a first region of the wall of a housing using an array of actuators to produce an audio output, detect a touch along the first region using a sensor, and cause movement of a second region of the wall of the housing using the array of actuators to produce the audio output in response to detecting the touch. The processing unit may be operable to cease movement of the first region in response to detecting the touch or to cause continued movement of the first region to produce the audio output upon detecting the touch. The processing unit may be operable to cause movement of the first region to produce a haptic output in response to detecting the touch. If so, the processing unit may be operable to compare the audio output to an expected audio output and cause the second region to produce an adjusted audio output in response to a determination that the audio output is different than the expected audio output. The adjusted audio output may have a frequency range that is shifted with respect to the audio output.

Although the example method 1100 is illustrated and described as including particular operations performed in a particular order, it is understood that this is an example. In various implementations, various orders of the same, similar, and/or different operations may be performed without departing from the scope of the present disclosure.

For example, the example method 1100 is illustrated and described as determining touch before producing sound. However, it is understood that this is an example. In some implementations, the electronic device may produce sound and then monitor for a touch in the region used to produce the sound. In such an example, the electronic device may respond to a touch detected during sound production by changing the region used to produce the sound, changing the region used to produce the sound if the produced sound is dampened or otherwise attenuated, and so on. Various configurations are possible and contemplated without departing from the scope of the present disclosure.

Figure 12:
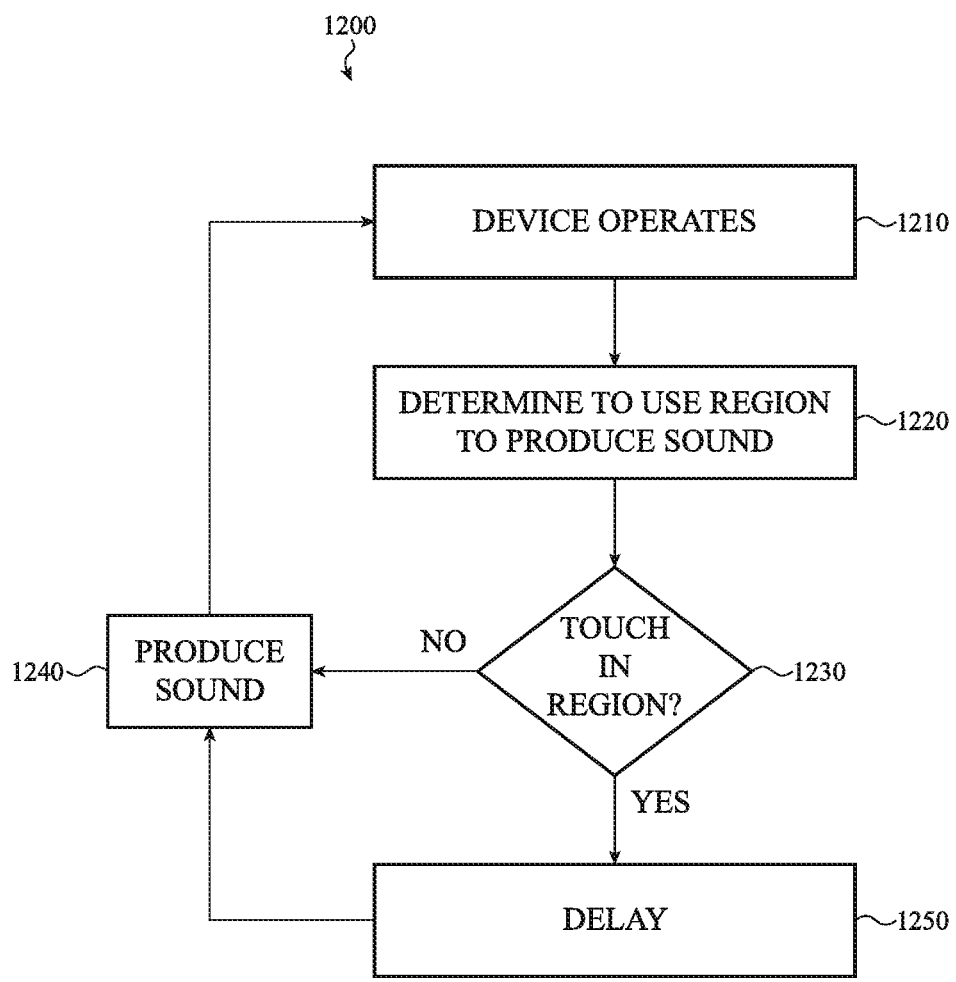
FIG. 12 depicts a flow chart illustrating a third example method for operating acoustic/haptic actuators.

By way of another example of multiple function housings that may produce sound and haptics and adjust to various operating conditions, FIG. 12 depicts a flow chart illustrating a third example method 1200 for operating acoustic/haptic actuators. The method 1200 may be performed by one or more of the electronic devices and/or acoustic/haptic actuators of FIGS. 1-2C and 4-9B.

At 1210, an electronic device operates. The flow proceeds to 1220 where the electronic device determines to produce sound by moving a region of a housing. Next, the flow proceeds to 1230 where the electronic device determines whether or not the determined region is currently being touched.

If so, the flow may proceed to 1250 where the electronic device delays producing the sound. The flow may then return to 1230 where the electronic device again determines whether or not the region is currently being touched.

For example, a user may be touching the region that the electronic device is going to use to produce sound. This touch may interfere with production of the sound. However, the touch may be transient. If the user only momentarily touches the region, the electronic device may still be able to use the region to produce the sound by briefly delaying until the user is no longer touching and then producing the sound. For example, the electronic device may delay sound production for one second and check again to see if the touch is still present. This may allow the electronic device to use the region to produce the sound without noticeably affecting sound production. In various implementations, the electronic device may resort to other measures if the electronic device delays multiple times and the touch is still detected.

Otherwise, if the electronic device determines the determined region is not currently being touched, the flow may proceed to 1240 where the electronic device produces the sound. After the sound is produced, the flow may return to 1210 where the electronic device continues to operate.

Although the example method 1200 is illustrated and described as including particular operations performed in a particular order, it is understood that this is an example. In various implementations, various orders of the same, similar, and/or different operations may be performed without departing from the scope of the present disclosure.

For example, the example method 1200 is illustrated and described as detecting a touch, delaying until the touch is no longer present, and then producing the sound using the region of the housing. However, it is understood that this is an example. In various implementations, the electronic device may detect one or more touches during sound production and may delay each time and/or perform other procedures to mitigate the effect of the touch until sound production is complete. Numerous configurations are possible and contemplated without departing from the scope of the present disclosure.

By way of another example, an electronic device may delay certain types of audio but not delay other types of audio. By way of illustration, a type of the audio may be a notification-type (such as an audio tone alerting that an email or other message has been received, a download has completed, and so on), a media-stream-type (a sequence of audio content such as a song, audio portion of a movie or other video file, human speech), a non-notification-type (which may be a media-stream-type or any type of audio not produced to provide an alert); and so on. Audio of a notification-type may be delayed without adversely impacting a user experience. However, audio of a media-stream-type may not be delayed without adversely impacting a user's experience as delays would distort the media stream due to the connection of one portion of the media stream to others over time. The user's experience may be less adversely impacted by allowing the audio production to be affected by the touch than by delaying the media stream until the user stops touching the housing. As such, upon detecting a touch during audio production, the electronic device may detect whether the audio is of a notification-type or a media-stream-type. If the type is the notification-type, the electronic device may delay production of the audio. However, if the audio type is a media-stream-type, the electronic device may produce the audio without delay. The electronic device may instead attempt to compensate for the touch in other ways discussed herein.

Figure 13:
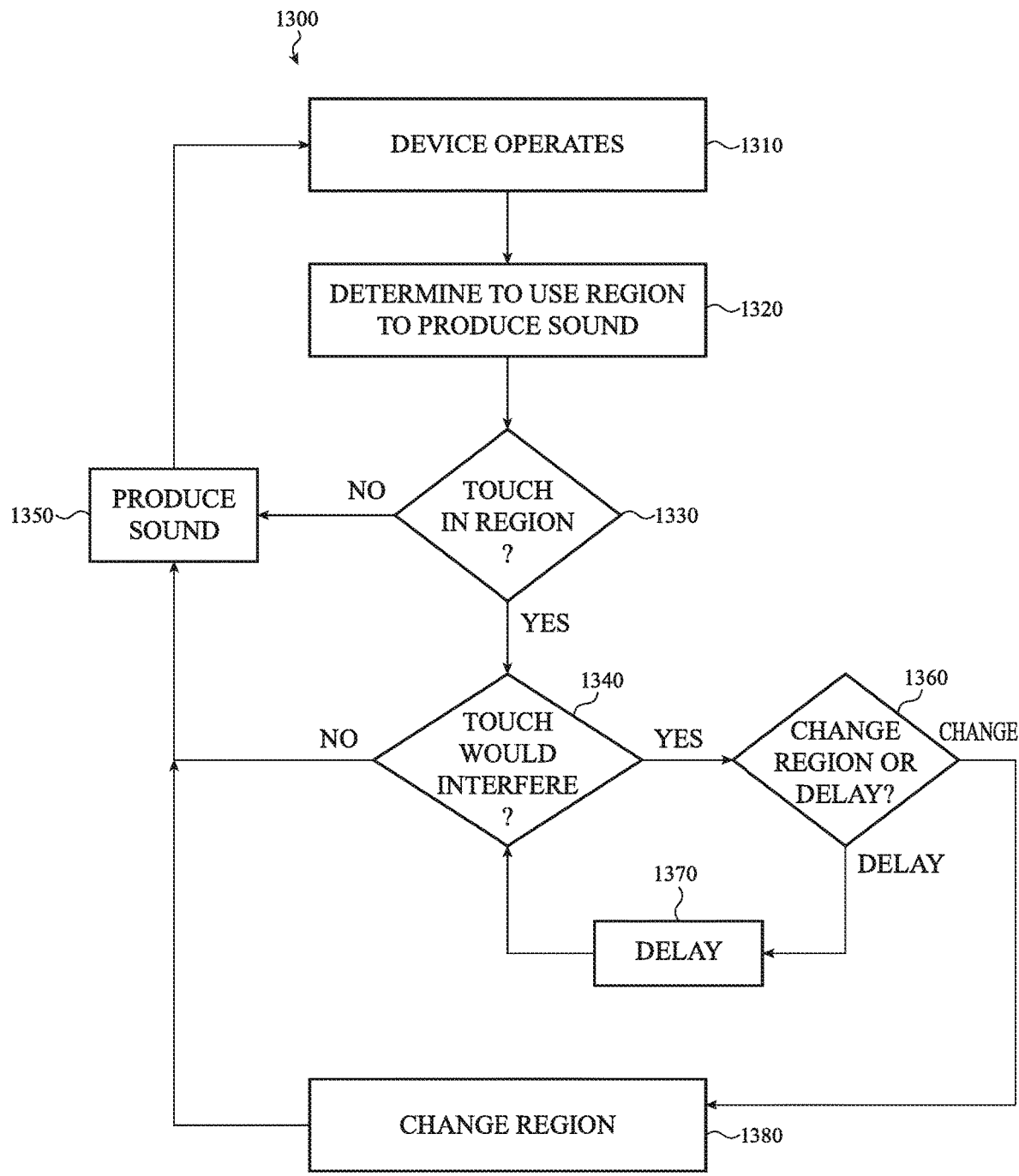
FIG. 13 depicts a flow chart illustrating a fourth example method for operating acoustic/haptic actuators.

By way of still another example of multiple function housings that may produce sound and haptics and adjust to various operating conditions, FIG. 13 depicts a flow chart illustrating a fourth example method 1300 for operating acoustic/haptic actuators. The method 1300 may be performed by one or more of the electronic devices and/or acoustic/haptic actuators of FIGS. 1-2C and 4-9B.

At 1310, an electronic device operates. At 1320, the electronic device determines to use a housing region to produce sound. The flow then proceeds to 1330 where the electronic device determines whether or not a touch is detected in that region.

If so, the flow proceeds to 1340. Otherwise, the flow proceeds to 1350 where the electronic device moves the housing region to produce the sound. The flow then returns to 1310 where the electronic device continues to operate.

At 1340, after the electronic device determines that a touch is detected in the region, the electronic device may determine whether or not the touch would interfere with sound production. For example, the electronic device may determine that the sound is low frequency sound and that the touch would not adversely interfere with sound production. By way of another example, the electronic device may determine that the sound is high frequency sound and that the touch would adversely interfere with sound production.

By way of illustration, the electronic device may determine whether or not the sound is below a frequency threshold. For example, the frequency threshold may be approximately 2 kilohertz. If the sound is below the frequency threshold, the electronic device may determine that the touch would not interfere with sound production. Conversely, if the sound meets or exceeds the frequency threshold, the electronic device may determine that the touch would interfere with sound production.

In a third example, the electronic device may determine the force applied by the touch or other characteristics of the touch. For example, touch may be detected using a capacitive touch sensor. The touch may be a finger pressed against the region. The finger may spread the more that force is applied. This may correspond to the size of the area where the touch is detected using the capacitive touch sensor. Higher amounts of force exerted, corresponding to larger detected areas, may be more likely to adversely impact sound production. Conversely, lower amounts of force exerted, corresponding to smaller areas, may be less likely to adversely impact sound production. This may be due to low amount of force being less likely to interfere with housing movement. In such an example, the electronic device may determine the touch would not interfere if the applied force is lower than a threshold and would interfere if the applied force is above a threshold.

If the electronic device determines that the touch would not interfere, the flow may proceed to 1350 where the electronic device produces the sound. Otherwise, the flow may proceed to 1360.

At 1360, the electronic device may determine whether to change the region or delay. For example, the electronic device may first attempt to delay on the assumption that the touch may be brief and then change regions if the touch is still present after the delay. By way of another example, the electronic device may determine a type of the sound (such as whether the sound is a notification-type or a media-stream-type) and determine to delay if the sound is a first type and change regions if the sound is a second type.

If the electronic device determines to delay, the flow proceeds to 1370 where the electronic device delays before the flow returns to 1340 and the electronic device determines whether or not a touch that would interfere is still present. Otherwise, if the electronic device determines to change regions, the flow proceeds to 1380 where the electronic device changes regions before the flow proceeds to 1350 and the electronic device produces the sound.

For example, a processing unit of an electronic device may produce an audio output using an array of actuators to move a wall of a housing. The processing unit may determine a location of a touch using a sensor, produce a localized haptic at the location of the touch by using the array of actuators to move the wall of the housing (such as by using a second actuator of the array of actuators corresponding to the location of the touch to produce the localized haptic), and modify a first audio output of a first actuator of the array of actuators in response to determining that the location of the touch is proximate to the first actuator. In some implementations, the processing unit may be further operable to modify a second audio output of a second actuator of the array of actuators in response to the touch.

In some implementations of such examples, the processing unit determines a type of audio corresponding to the audio output (such as a notification-type as opposed to non-notification type, such as a media-stream-type). The processing unit may modify the first audio output in a first manner if the audio is a first type and in a second manner if the audio is a second type. For example, the processing unit may delay the first audio output if the audio output is a notification-type and causing the first actuator to cease producing the first audio output while causing a second actuator to produce a second audio output if the audio output is a media-stream-type.

Although the example method 1300 is illustrated and described as including particular operations performed in a particular order, it is understood that this is an example. In various implementations, various orders of the same, similar, and/or different operations may be performed without departing from the scope of the present disclosure.

For example, the example method 1300 is illustrated and described as either changing regions or delaying to adjust for a detected touch that would interfere with sound production. However, in other implementations, the electronic device may adjust in other ways to produce the sound despite the touch. By way of illustration, in some examples, the electronic device may produce the sound by moving the region more than it would have otherwise in order to overcome the dampening effect that the touch would have on housing movement. Various configurations are possible and contemplated without departing from the scope of the present disclosure.

Figure 14:
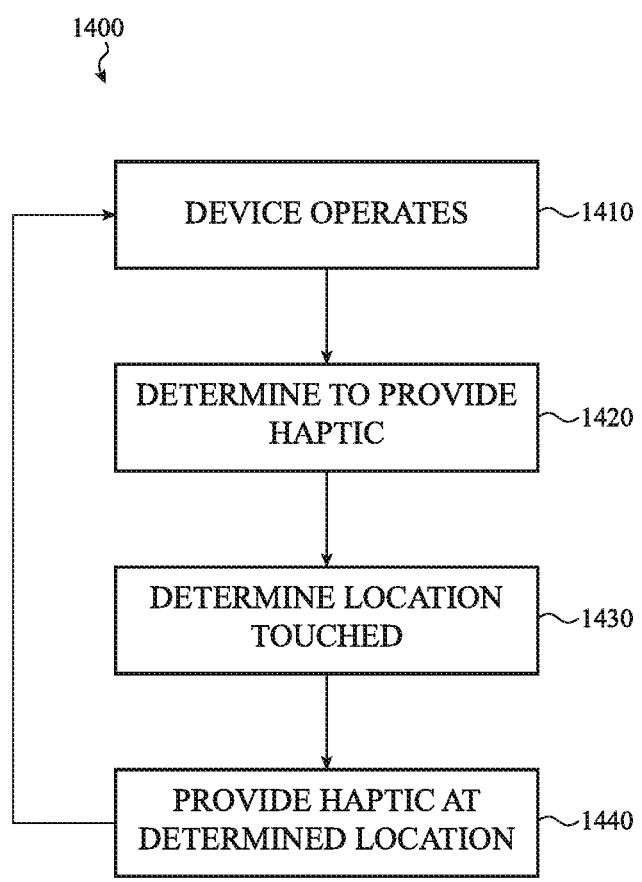
FIG. 14 depicts a flow chart illustrating a fifth example method for operating acoustic/haptic actuators.

FIG. 14 depicts a flow chart illustrating a fifth example method 1400 for operating acoustic/haptic actuators. The method 1400 may be performed by one or more of the electronic devices and/or acoustic/haptic actuators of FIGS. 1-2C and 4-9B.

At 1410, an electronic device operates. At 1420, the electronic device determines to provide a haptic output. For example, an event may occur and the electronic device may determine to provide a haptic output regarding the occurrence. Such events may include receipt of an input (such as a touch to a touch sensor), receipt of an incoming communication (such as a phone call, an email, a text message, and so on), completion of an operation that the electronic device is performing, completion of a file download, input requested by an application executing on the electronic device, connection or disconnection of a communication network, a battery or other power alert, and so on.

The flow may then proceed to 1430 where the electronic device determines a location on a housing that is currently being touched. Next, the flow may proceed to 1440 where the electronic device provides the haptic output at the determined location. This may ensure that the provided haptic output is discernible to a user.

Although the example method 1400 is illustrated and described as including particular operations performed in a particular order, it is understood that this is an example. In various implementations, various orders of the same, similar, and/or different operations may be performed without departing from the scope of the present disclosure.

For example, the example method 1400 is illustrated and described as providing the haptic output at a location that the electronic device is currently being touched. However, in some examples, a user may not currently be touching the electronic device. In such examples, the electronic device may respond to the detection of no touch in a variety of different ways. In some implementations, the electronic device may delay to wait for a touch. In other implementations, the electronic device may provide the haptic output through a surface not determined to currently be touched. In still other examples, the electronic device may provide another kind of output (such as audio output, visual output, and so on) instead of the haptic output. Various configurations are possible and contemplated without departing from the scope of the present disclosure.

Figure 15:
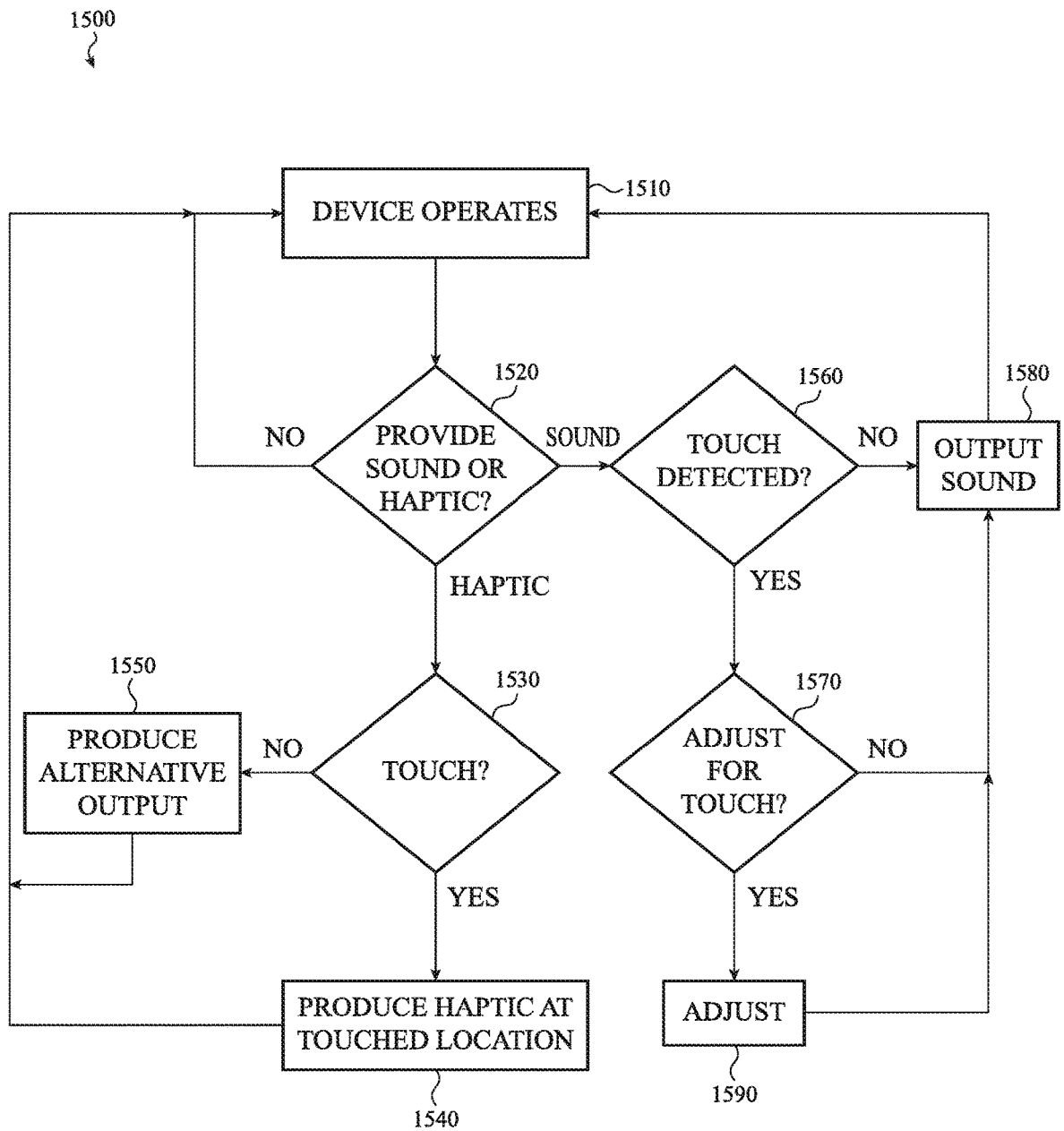
FIG. 15 depicts a flow chart illustrating a sixth example method for operating acoustic/haptic actuators.

By way of still another example of multiple function housings that may produce sound and haptics and adjust to various operating conditions, FIG. 15 depicts a flow chart illustrating a sixth example method 1500 for operating acoustic/haptic actuators. The method 1500 may be performed by one or more of the electronic devices and/or acoustic/haptic actuators of FIGS. 1-2C and 4-9B.

At 1510, an electronic device operates. At 1520, the electronic device determines whether or not to produce sound or a haptic output using a housing. If the electronic device determines to produce a haptic output using the housing, the flow proceeds to 1530. If the electronic device determines to produce sound using the housing, the flow proceeds to 1560. Otherwise, if the electronic device determines to neither produce sound nor haptic output, the flow returns to 1510 where the electronic device continues to operate.

At 1530, after the electronic device determines to produce a haptic output using the housing, the electronic device may determine if the housing is being touched. If so, the flow may proceed to 1540 where the electronic device produces the haptic output at the location a touch is detected before the flow returns to 1510 and the electronic device continues to operate. Otherwise, the flow may proceed to 1550 where the electronic device provides alternative output to the haptic output (such as audible output, visual output, and so on) before the flow returns to 1510 and the electronic device continues to operate.

At 1560, after the electronic device determines to produce sound using the housing, the electronic device may determine if a region via which the electronic device is going to produce the sound is currently being touched. If not, the flow proceeds to 1580 where the electronic device produces the sound before the flow returns to 1510 and the electronic device continues to operate. Otherwise, the flow proceeds to 1570.

At 1570, the electronic device determines whether or not to adjust for the detected touch. In some situations, the electronic device may determine that the touch would not interfere with sound production and may therefore determine not to adjust for the detected touch. For example, the electronic device may determine that the touch would not interfere if the sound is of a sufficiently low frequency that the touch would not dampen produced sound. In other situations, the electronic device may determine that the touch would interfere with sound production and may therefore determine to adjust for the detected touch. For example, the electronic device may determine that the touch would interfere if the sound is of a high enough frequency that the touch would dampen produced sound. If the electronic device determines not to adjust, the flow may proceed to 1580 where the electronic device produces the sound. Otherwise, the flow may proceed to 1590 where the electronic device adjusts for the detected touch before the flow proceeds to 1580 where the electronic device produces the sound.

The electronic device may adjust for the detected touch in a variety of different ways. The electronic device may adjust by changing the region used to produce the sound. The electronic device may also adjust by delaying sound production until the touch is no longer detected. The electronic device may also adjust by altering a waveform used for sound production to compensate for the touch, amplifying the movement to compensate for a dampening effect caused by the touch, and so on. Various configurations are possible and contemplated without departing from the scope of the present disclosure.

Although the example method 1500 is illustrated and described as including particular operations performed in a particular order, it is understood that this is an example. In various implementations, various orders of the same, similar, and/or different operations may be performed without departing from the scope of the present disclosure.

For example, the example method 1500 is illustrated and described as either producing sound or providing haptic output. However, it is understood that this is an example. In some implementations, the electronic device may produce sound and provide haptic output as the same and/or substantially similar times. The electronic device may perform various techniques for ensuring that the outputs do not interfere with each other, such as moving different regions of the housing to produce the sound and provide the haptic output. Various configurations are possible and contemplated without departing from the scope of the present disclosure.

Figure 16:
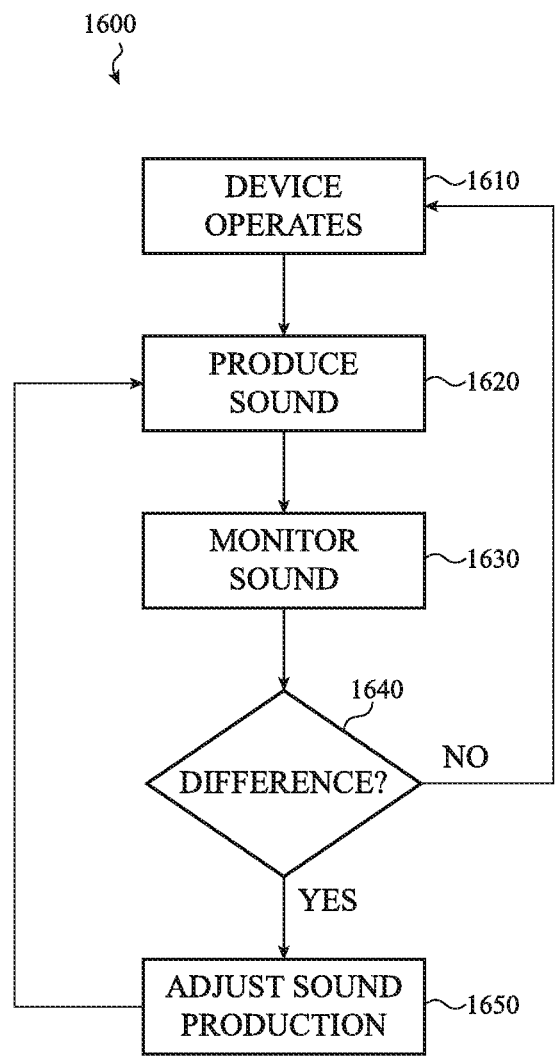
FIG. 16 depicts a flow chart illustrating a seventh example method for operating acoustic/haptic actuators.

FIG. 16 depicts a flow chart illustrating a seventh example method 1600 for operating acoustic/haptic actuators. The method 1600 may be performed by one or more of the electronic devices and/or acoustic/haptic actuators of FIGS. 1-2C and 4-9B.

At 1610, an electronic device operates. At 1620, the electronic device produces sound by moving at least a portion of a housing. At 1630, the electronic device monitors the produced sound or audio output.

At 1640, the electronic device determines whether or not there is a difference between the audio output or sound the electronic device attempted to produce and the audio output that the electronic device monitors. For example, an object touching the housing being used to produce the sound may cause the sound to differ from the sound the electronic device attempted to produce. If not, the flow returns to 1610 once the electronic device finishes producing the sound and the electronic device continues to operate.

Otherwise, the flow proceeds to 1650 where the electronic device adjusts sound production before continuing to produce the sound. The electronic device may adjust sound production in a variety of different ways. In various implementations, the electronic device may adjust sound production by changing a region of the housing used to produce the sound, delaying sound production, altering a waveform used for sound production, increasing a signal used for sound production, decreasing a signal used for sound production, and so on.

By way of illustration, a processing unit of may be operable to produce a first audio output using an array of actuators positioned below a wall of the housing; monitor the first audio output using an audio sensor; determine if the first audio output is different from an expected audio output; and in response to determining that the first audio output is different from the expected audio output, modify an output of a first actuator to produce a second audio output that is different from the first audio output. The processing unit may also be operable to produce a haptic output using the array of actuators.

In some examples, the processing unit may modify the first audio output by adjusting an input waveform provided to the first actuator. For example, the processing unit may adjust an amplitude of the input waveform, adjust a frequency of the input waveform, and so on.

Although the example method 1600 is illustrated and described as including particular operations performed in a particular order, it is understood that this is an example. In various implementations, various orders of the same, similar, and/or different operations may be performed without departing from the scope of the present disclosure.

For example, the example method 1600 is illustrated and described as producing the sound and then monitoring the audio output. However it is understood that this is illustrated in this manner for the purposes of simplicity and clarity. In various implementations, audio output production and monitoring may be simultaneously performed, consecutively performed, and/or variously performed without departing from the scope of the present disclosure. Various configurations are possible and contemplated.

In some implementations, the electronic device may use the sound comparison to determine a location of a touch to the housing. For example, a touch to the housing may affect production of sound. Different regions may be used to produce different sound at different frequency ranges, such as a first region used to produce frequencies over 2 kilohertz and a second region used to produce frequencies below 2 kilohertz. If the electronic device compares the produced sound to the expected sound and determines that the frequencies above 2 kilohertz are different, the electronic device may determine that there is a touch in the first region. Conversely, if the electronic device compares the produced sound to the expected sound and determines that the frequencies below 2 kilohertz are different, the electronic device may determine that there is a touch in the second region.

Returning to FIG. 1, the housing 101 may be formed of any number of different materials. Examples of such materials include metal, plastic, glass, ceramic, and so on.

In numerous implementations, the electronic device 100 may use the acoustic/haptic actuators to produce sound waves and haptic output at different times. For example, the electronic device 100 may alternate use of the acoustic/haptic actuators. In other implementations, the electronic device 100 may use the acoustic/haptic actuators to produce sound waves and haptic output simultaneously. Various configurations are possible and contemplated without departing from the scope of the present disclosure.

As illustrated, the electronic device 100 may be a laptop computing device that includes a trackpad 104 and a keyboard 105 coupled to the lower housing 102. The laptop computing device may also include an upper housing 103 hingedly and/or pivotably coupled to the lower housing 102 by a hinge 108. The upper housing 103 may include a display 106, a camera 107 or other sensors (such as one or more proximity sensors, touch sensors, or the like), and so on. The laptop computing device may include other components not shown. Such other components may include, but are not limited to, one or more processing units, one or more communication components, one or more non-transitory storage media (which may take the form of, but is not limited to, a magnetic storage medium; optical storage medium; magneto-optical storage medium; read only memory; random access memory; erasable programmable memory; flash memory; or the like), and so on.

Further, although the electronic device 100 is illustrated as a laptop computing device, it is understood that this is an example. In various implementations, the electronic device 100 may be a desktop computing device, a cellular telephone, a smart phone, a tablet computing device, a wearable device, a mobile computing device, a kitchen appliance, an automobile, a display, a printer, a keyboard, and so on.

As described above and illustrated in the accompanying figures, the present disclosure relates to acoustic/haptic actuators that use external housing surfaces to produce sound and haptic output. An electronic device has a housing that forms an exterior surface of the electronic device. An array of actuators is coupled to the housing and is operable to move the housing in order to produce sound waves and/or haptic output via the exterior surface. In this way, less space is consumed by acoustic and haptic devices as compared to similar conventional devices, thereby allowing for thinner electronic devices and/or room for other components within the housing.

In the present disclosure, the methods disclosed may be implemented as sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electronic device comprising:
   a housing having a wall that defines an exterior surface of the electronic device;

a sensor operable to detect a touch along the exterior surface;
an array of actuators positioned below the wall; and
a processing unit operably coupled to the sensor and the array of actuators and that is operable to:
produce an audio output using the array of actuators while the touch is present along the exterior surface;
determine a location of the touch using the sensor;
in response to determining that the location of the touch is proximate to a first actuator of the array of actuators, cause the array of actuators to be driven by an audio waveform that produces a modified audio output, the modified audio output produced using at least the first actuator; and
in response to determining that the location of the touch is proximate to the first actuator and in response to determining that a force of the touch exceeds a threshold, cause the array of actuators to be driven by a haptic waveform that produces a haptic output, the audio waveform including audio waveform portions, the haptic waveform including haptic waveform portions, and the audio waveform portions being multiplexed with the haptic waveform portions.

2. The electronic device of claim 1, wherein:
the processing unit is operable to determine a type of audio corresponding to the audio output;
in accordance with the type of audio being a notification-type of audio, the processing unit is operable to delay the modified audio output; and
in accordance with the type of audio being a media-stream-type of audio, the processing unit is operable to increase the modified audio output.

3. The electronic device of claim 1, wherein the array of actuators comprises:
a first group of actuators of the array of actuators operable to move a first group of regions of the housing to produce a high-frequency audio output having a first frequency range; and
a second group of actuators of the array of actuators to move a second group of regions of the housing to produce a low-frequency audio output having a second frequency range that is different than the first frequency range.

4. The electronic device of claim 3, wherein:
each region of the first group of regions is smaller than each region of the second group of regions; and
the first frequency range is higher than the second frequency range.

5. The electronic device of claim 1, wherein:
the housing is a lower housing;
the wall is a first wall;
the exterior surface is a first exterior surface;
the array of actuators is a first array of actuators; and
the electronic device further comprises:
an upper housing, pivotably connected to the lower housing and having a second wall that defines a second exterior surface of the electronic device;
a second array of actuators positioned below the second wall;
a display coupled to the upper housing; and
a keyboard coupled to the lower housing.

6. The electronic device of claim 1, wherein the processing unit is further operable to:
the modified audio output using at least a second actuator of the array of actuators.

7. An electronic device comprising:
a housing that defines an exterior surface of the electronic device;
an audio sensor operable to sense a first audio output of the electronic device;
an array of actuators positioned below a wall of the housing;
a sensor configured to determine a location of a touch on the exterior surface; and
a processing unit operably coupled to the audio sensor and the array of actuators and operable to:
produce the first audio output using the array of actuators while the touch is present on the exterior surface;
monitor the first audio output using the audio sensor;
determine if the first audio output is different from an expected audio output; and
in response to determining that the first audio output is different from the expected audio output, cause the array of actuators to be driven by an audio waveform that produces a second audio output that is different from the first audio output; and
in response to determining that the location of the touch is proximate to a first actuator and that a force of the touch exceeds a threshold, cause the array of actuators to be driven by a haptic waveform that produces a haptic output, the audio waveform including audio waveform portions, the haptic waveform including haptic waveform portions, and the audio waveform portions being multiplexed with the haptic waveform portions.

8. The electronic device of claim 7, wherein the processing unit is operable to produce the second audio output by adjusting a frequency or an amplitude of a signal provided to at least a first actuator of the array of actuators.

9. The electronic device of claim 7, wherein:
the electronic device further comprises a keyboard and a trackpad; and
the array of actuators is operable to move a region of the wall of the housing adjacent to at least one of the keyboard or the trackpad to produce the first audio output or the second audio output.

10. The electronic device of claim 7, wherein the processing unit is operable to determine the location of the touch on the exterior surface using a difference between the first audio output and the expected audio output.

11. The electronic device of claim 7, wherein:
the housing defines an array of thinned regions; and
one or more actuators of the array of actuators are coupled to a respective thinned region of the array of thinned regions.

12. An electronic device, comprising:
a housing that defines an exterior surface of the electronic device;
a sensor operable to detect a touch along the exterior surface;
an array of actuators positioned below a wall of the housing; and
a processing unit operably coupled to the sensor and the array of actuators and operable to:
cause the array of actuators to be driven by a first audio waveform that moves a first region of the wall of the housing to produce an audio output;
detect the touch along the first region of the wall of the housing using the sensor;
in response to detecting the touch, cause the array of actuators to be driven by a second audio waveform that moves a second region of the wall of the housing to produce the audio output; and in response to a force of the touch along the exterior surface exceeding a threshold, cause the array of actuators to be driven by a haptic waveform that produces a haptic output, the second audio waveform including audio waveform portions, the haptic waveform including haptic waveform portions, and the audio waveform portions being multiplexed with the haptic waveform portions.

13. The electronic device of claim 12, wherein the processing unit is operable to cease movement of the first region in response to detecting the touch.

14. The electronic device of claim 12, wherein:

the processing unit is operable to compare the audio output to an expected audio output; and the processing unit is operable to cause the array of actuators to be driven by the second audio waveform in response to a determination that the audio output is different than the expected audio output.

15. The electronic device of claim 14, wherein the audio output produced by driving the array of actuators with the second audio waveform has a frequency range that is shifted with respect to the audio output produced by driving the array of actuators with the first audio waveform.

16. The electronic device of claim 12, wherein the processing unit is operable to cause continued movement of the first region to produce the audio output upon detecting the touch.

* * * * *